US009233507B2

(12) United States Patent
Bibas

(10) Patent No.: US 9,233,507 B2
(45) Date of Patent: Jan. 12, 2016

(54) 3D PRINTING APPARATUS WITH SENSOR DEVICE

(71) Applicant: Charles Bibas, Great Neck, NY (US)

(72) Inventor: Charles Bibas, Great Neck, NY (US)

( * ) Notice: Subject to any disclaimer, the term of this patent is extended or adjusted under 35 U.S.C. 154(b) by 0 days.

(21) Appl. No.: 14/538,924

(22) Filed: Nov. 12, 2014

(65) Prior Publication Data

US 2015/0147424 A1 May 28, 2015

Related U.S. Application Data

(60) Provisional application No. 61/907,456, filed on Nov. 22, 2013, provisional application No. 62/059,924, filed on Oct. 5, 2014.

(51) Int. Cl.
*B29C 67/00* (2006.01)
*B33Y 30/00* (2015.01)
*B33Y 50/02* (2015.01)

(52) U.S. Cl.
CPC ......... *B29C 67/0088* (2013.01); *B29C 67/0059* (2013.01); *B33Y 30/00* (2014.12); *B33Y 50/02* (2014.12)

(58) Field of Classification Search
CPC ........ B29C 45/67; B29C 45/80; B29C 45/66; B29C 45/82; B29C 47/92; B29C 45/76; B29C 67/0051; B29C 67/0085; B29C 67/0088; B29C 67/00
USPC .............. 425/150, 138, 375, 162, 174.4, 174, 425/DIG. 41; 264/401, 482, 464, 540, 405, 264/406, 497, 460, 463, 113, 164, 308
See application file for complete search history.

(56) References Cited

U.S. PATENT DOCUMENTS

| 6,950,189 B2 * | 9/2005 | Jung et al. ..................... 356/419 |
| 2013/0089642 A1 * | 4/2013 | Lipson et al. ................. 426/115 |
| 2014/0210137 A1 * | 7/2014 | Patterson et al. ............. 264/401 |
| 2014/0271964 A1 * | 9/2014 | Roberts et al. ................ 425/150 |
| 2015/0130100 A1 * | 5/2015 | Fiegener ............. B29C 67/0055 264/40.1 |

OTHER PUBLICATIONS

Exhibit A. Annotated version of Fig. 3 of US20130089642A1.*
U.S. Appl. No. 61/907,456.*
U.S. Appl. No. 62/059,924.*

* cited by examiner

*Primary Examiner* — James Sanders
*Assistant Examiner* — Leith S Shafi

(57) ABSTRACT

The various embodiments herein provide a 3D printing apparatus with a sensor device. The apparatus comprises a base platform, a support frame mounted on the base platform and a print head mounted on the support frame. The print head is aligned with a working surface on which the 3D object to be printed is placed. A sensor device is configured to determine and adjust a spatial parameter between the working surface and a print head. The sensor device is mounted on the print head and detects misalignment in the position of the working surface with the print head. The sensor device employs photo detection method for determining a desired orientation of the working surface. The printing apparatus comprises a controller unit for receiving the input from the sensor device to correct the orientation of the working surface.

10 Claims, 37 Drawing Sheets

Relative Radiant Intensity vs. Angular Displacement

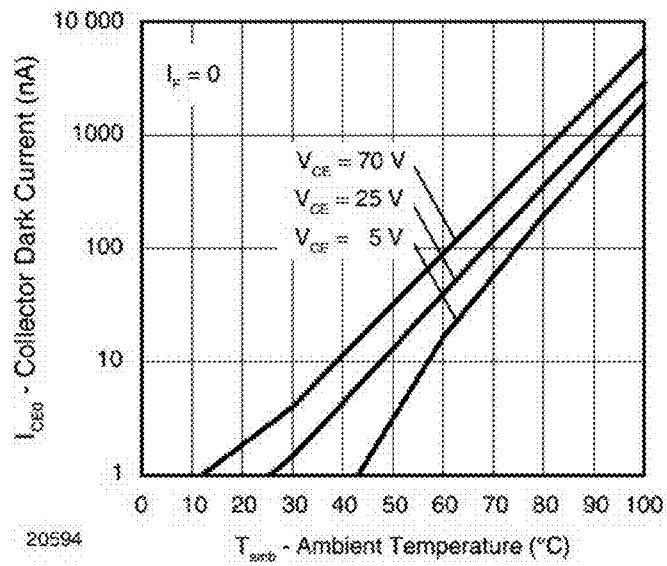
*FIG.17A* Collector Dark Current vs. Ambient Temperature
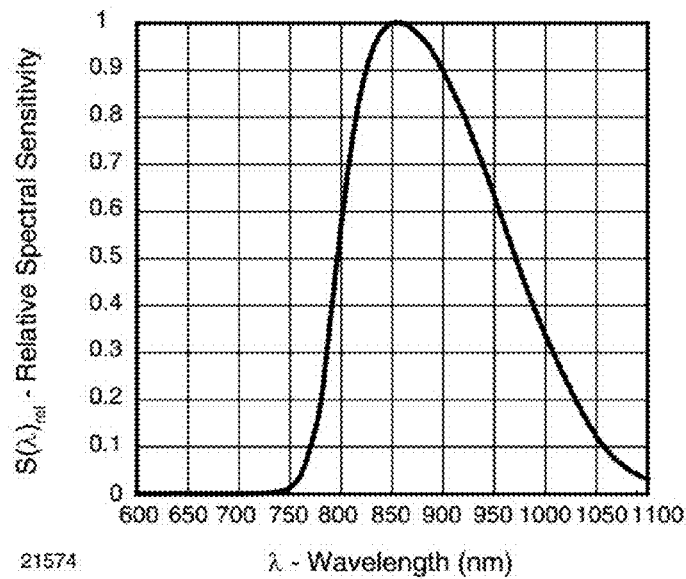
*FIG.17B* Relative Spectral Sensitivity vs Wavelength

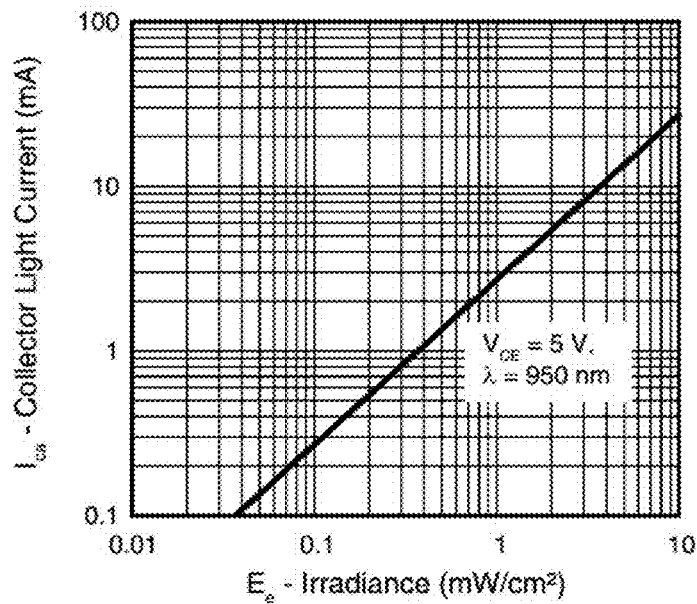
*FIG.17C* Collector Light CUrrent vs Irradiance
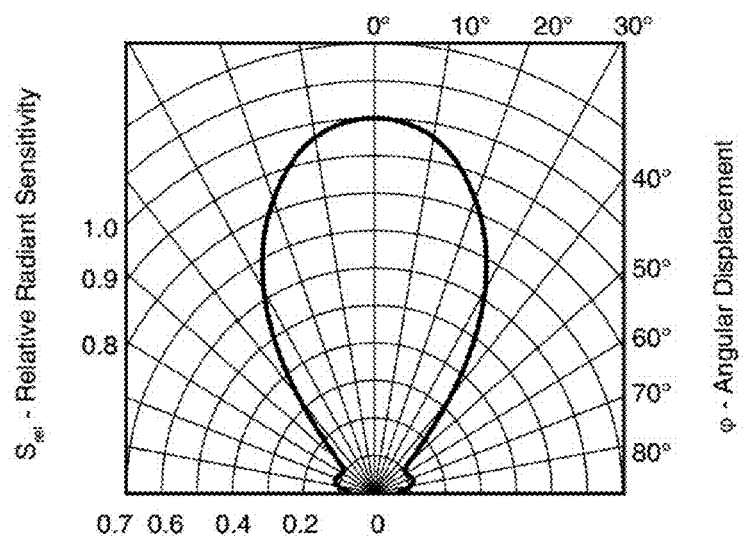
*FIG.17D* Relative Radiant Sensitivity vs Angular Displacement

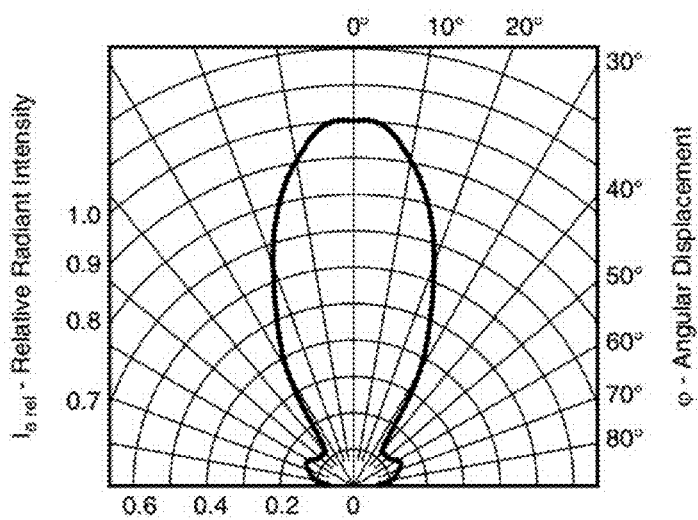
*FIG.19A* Relative Radiant Sensitivity vs Angular Displacement
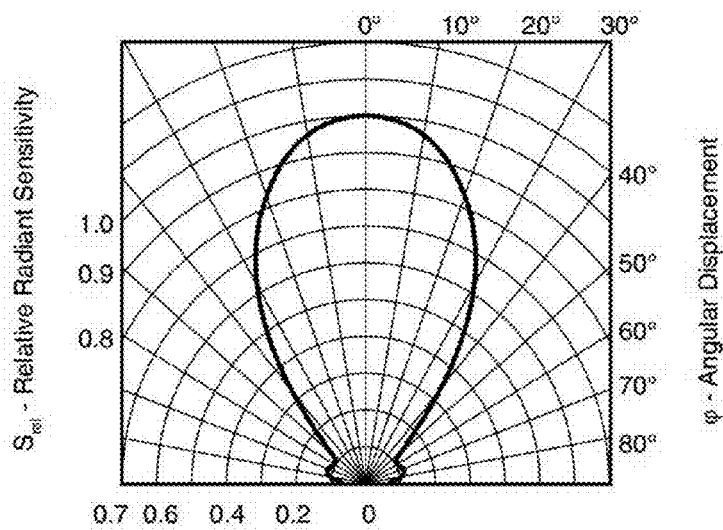
*FIG.19B* Relative Radiant Sensitivity vs Angular Displacement Collector Light Current vs. Irradiance

3D PRINTING APPARATUS WITH SENSOR DEVICE

CROSS-REFERENCE TO RELATED APPLICATION

The present application claims the benefit and priority of the U.S. Provisional patent Application Ser. No. 61/907,456 filed on Nov. 22, 2013 and provisional patent Application No. 62/059,924 filed on Oct. 17, 2014 and the entire contents of which is incorporated by reference herein.

BACKGROUND

1. Technical Field

The embodiments herein generally relate to a three-dimensional (3D) printing system. The embodiments herein particularly relate to a sensor device for the 3D printing apparatus. The embodiments herein more particularly relates to a sensor device used for determining and adjusting a spatial parameter between a working surface of the 3D printing apparatus and a printing head.

2. Description of the Related Art

The capability of manufacturing 3D objects to design specifications is developed steadily over time. Initially, computer-controlled machines and automated machining equipments are programmed to deform, cut, shape, and/or alter a pre-existing 3D object. More recently, 3D printing apparatus have been developed to extrude multiple thin layers of a hardened material in a programmed pattern to form a 3D object.

The efficiency of the 3D printing apparatus is continuously increased from developing initially coarse objects to increasingly refined shapes and tolerances. For example, 3D printing apparatus have applications in numerous fields such as, medical arts, sculpture, and precision manufacturing. Accordingly, more opportunities are presented to improve the state of the art as the 3D printing space continues to evolve.

In the view of foregoing, there is a need for an effective and efficient system for testing, maintaining, and/or correcting a level or other desired orientation of a working surface of a 3D printing device upon which the 3D object is formed. Further, there is need for a system for testing, maintaining, and/or correcting an orientation of the working surface. Still further there is a need for a 3D printing apparatus that is reliable, easy to use, and resistant to wear and tear during the entire working life cycle.

The above mentioned shortcomings, disadvantages and problems are addressed herein and which will be understood by reading and studying the following specification.

OBJECTS OF THE EMBODIMENTS HEREIN

The primary object of the embodiments herein is to provide an effective and efficient apparatus for testing, maintaining, and/or correcting the level or other desired orientation of a working surface of the 3D printing device upon which the 3D object is formed.

Another object of the embodiments herein is to provide for a sensor device used for determining and adjusting a spatial parameter between a working surface of the 3D printing apparatus and a printing head.

Yet another object of the embodiments herein is to provide a reliable and easy to use printing apparatus configured to be resistant to wear and tear during the entire working life cycle of the 3D printing apparatus.

Yet another object of the embodiments herein is to provide a kit to be used with 3D printers.

SUMMARY

The various embodiments herein provide a 3D printing apparatus. The apparatus comprises a base platform and a support frame mounted on the base platform. The support frame comprises a plurality of platform supports mounted on the base platform. The plurality of platform supports comprises a first set of platform supports and a second set of platform supports. The first set of platform supports is extended along a first direction, and the second set of platform supports is extended along a second direction. The printing apparatus further comprises a build platform movably supported on the first set of platform supports. The build platform comprises a bed support frame, a motor mount and a bed. The motor mount is supported on the bed support frame and the bed is mounted on the bed support frame. The bed is arranged above the motor mount. The bed is a planar surface. The printing apparatus still further comprises a print head movably supported on the second set of platform supports through a print head support. The print head support is coupled to the second set of supports. The print head support is moved along the second set of supports. The print head defines an axis where the axis of the print head intersects the planar surface of the bed. The bed and the print head are moved with respect to each other. A sensor device and a reflective surface is provided on at least one of the print head and/or the bed. The sensor device and the reflective surface are provided respectively on the print head and the bed and vice versa. The sensor device comprises a plurality of photo detectors and at least one light source. The light source is configured to transmit a beam of light toward the reflective surface. A reflected beam of light from the reflective surface is directed toward the plurality of photo detectors, and each photo detector is configured to detect a reflected beam of light. The plurality of photo detectors is arranged in a plurality of concentric circles formed around the light source.

According to an embodiment herein, the print head is moved with respect to the bed in any one of the first direction, the second direction and a third direction. The second direction is perpendicular to the first direction and the third direction is perpendicular to both the first direction and the second direction.

According to an embodiment herein, the bed is movable with respect to the print head in any one of the first direction, the second direction and a third direction. The second direction is perpendicular to the first direction and the third direction is perpendicular to both the first direction and the second direction.

According to an embodiment herein, the plurality of photo detectors are arranged in an array.

According to an embodiment herein, each photo detector of the plurality of photo detectors is spaced from an adjacent photo detector by a preset distance.

According to an embodiment herein, the at least one light source is selected from a group consisting of a bulb, Light Emitting Diode (LED), and a luminescent source. The light source is configured to produce a single or multiple wavelengths and/or frequencies of light. The light is any one of a visible light, infrared light, and ultraviolet light. The preferred light source is an Infrared Light Emitting Diode (IrLED).

According to an embodiment herein, the photo detector is an electro-optical element configured to detect an optical property of the reflected light. The optical property of the reflected light includes a threshold quantity and intensity of the reflected light.

According to an embodiment herein, the photo detector is selected from a group consisting of a variable resistive element, a photoresistor, a photo diode, a photo transistor, a Charged Coupled Device (CCD).

According to an embodiment herein, the apparatus is configured both as a light source and a photo detector.

According to an embodiment herein, the photo detector is activated by the reflected beam of light. The photo detector is activated based on a variation in electrical property of the electro-optical element due to the reflected beam of light. The variation in electrical property of the electro-optical element includes a variation in resistance in a photo resistor and a variation in current in a photodiode and photo transistor.

According to an embodiment herein, the light source is activated before starting an operation of the print head or during the operation of the print head or after completing the operation of the print head.

According to an embodiment herein, the sensor device is provided on a self-contained element. The self-contained element is a chip or wafer or an integrated circuit board.

According to an embodiment herein, the sensor device is mounted on the print head surface where the Nozzle is mounted. Alternatively, the sensor device is formed integrally with the print head during a manufacturing of the print head or the sensor device separately coupled to the print head after the manufacturing of the print head.

According to an embodiment herein, the photo detectors are arranged in concentric circles to identify and ensure that the reflective surface of the bed is arranged in parallel to a surface of the sensor device and the reflective surface of the bed is perpendicular to a nozzle axis of the print head.

According to an embodiment herein, the 3D printing apparatus further comprises a plurality of step motors mounted on the motor mount. The plurality of step motors is operated to move the bed, to suppress the vibration forces on the bed and to inhibit damage to an exposed surface of the bed. The step motors is provided with a screw driver or hydraulic apparatus to exert an axial force on the bed. The step motors is provided with a buffering element to suppress the vibration forces on the board and to inhibit damage to an exposed surface of the bed. The buffering element is a cap or adapter.

According to an embodiment herein, the plurality of step motors is communicatively coupled with the plurality of photo detectors.

According to an embodiment herein, each step motor of the plurality of step motors is laterally offset from a center of mass of the bed.

According to an embodiment herein, the plurality of step motors are operated based on a point at which the reflected beam of light from the bed strikes the sensor device to correct any tilt of the print head with respect to a body of the print head so that a relative angle of the tilt of the bed with respect to the print head is zero, and the irradiance (Ee) intensity at any point with a same distance from the light source is same.

According to an embodiment herein, the plurality of stepper motors and the sensor device form a levelling mechanism to control a tilt of the bed and/or distance to the bed with respect to the print head.

According to an embodiment herein, the 3D printing apparatus further comprises a processor with a control board electrically coupled to the sensor device and the step motors to control an operation of the step motors based on an output from the photo detectors to control a movement and operation of the print head.

According to an embodiment herein, the processor is loaded with an algorithm to calculate a positional information associated with each photo detector of the plurality of photo detectors.

According to an embodiment herein, the processor is loaded with a software program to calculate a value θ, and wherein θ is defined as θ=arctan (LP/LZ), and wherein LP is a distance measured from the light source to a location on the sensor device, and wherein LZ is a distance measured from the light source to a plane of the bed.

According to an embodiment herein, the processor identifies an electrical signal produced by at least one photo detector of the plurality of photo detectors based on pre stored instructions.

According to an embodiment herein, the processor compares the electrical signal produced by the two different photo detectors of the plurality of photo detectors to detect the positional information of the photo detectors and to detect whether the sensor device is parallel to the reflective surface.

According to an embodiment herein, the 3D printing apparatus further comprises a polar sensor board communicatively connected to the plurality of step motors to control an operation of the plurality of the step motors to achieve a desired movement of the bed based on an output of the plurality of photo detectors and pre stored look-up table.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 17A-FIG. 17D illustrates a datasheet indicating the basic characteristics of phototransistor in the sensor device in the 3D printing apparatus, according to an embodiment herein.

FIG. 19A and FIG. 19B illustrate graphs indicating a relationship between relative intensity and angular displacement of the LED emitter and receiver respectively, in the sensor device in the 3D printing apparatus, according to an embodiment herein.

Figure 1A:
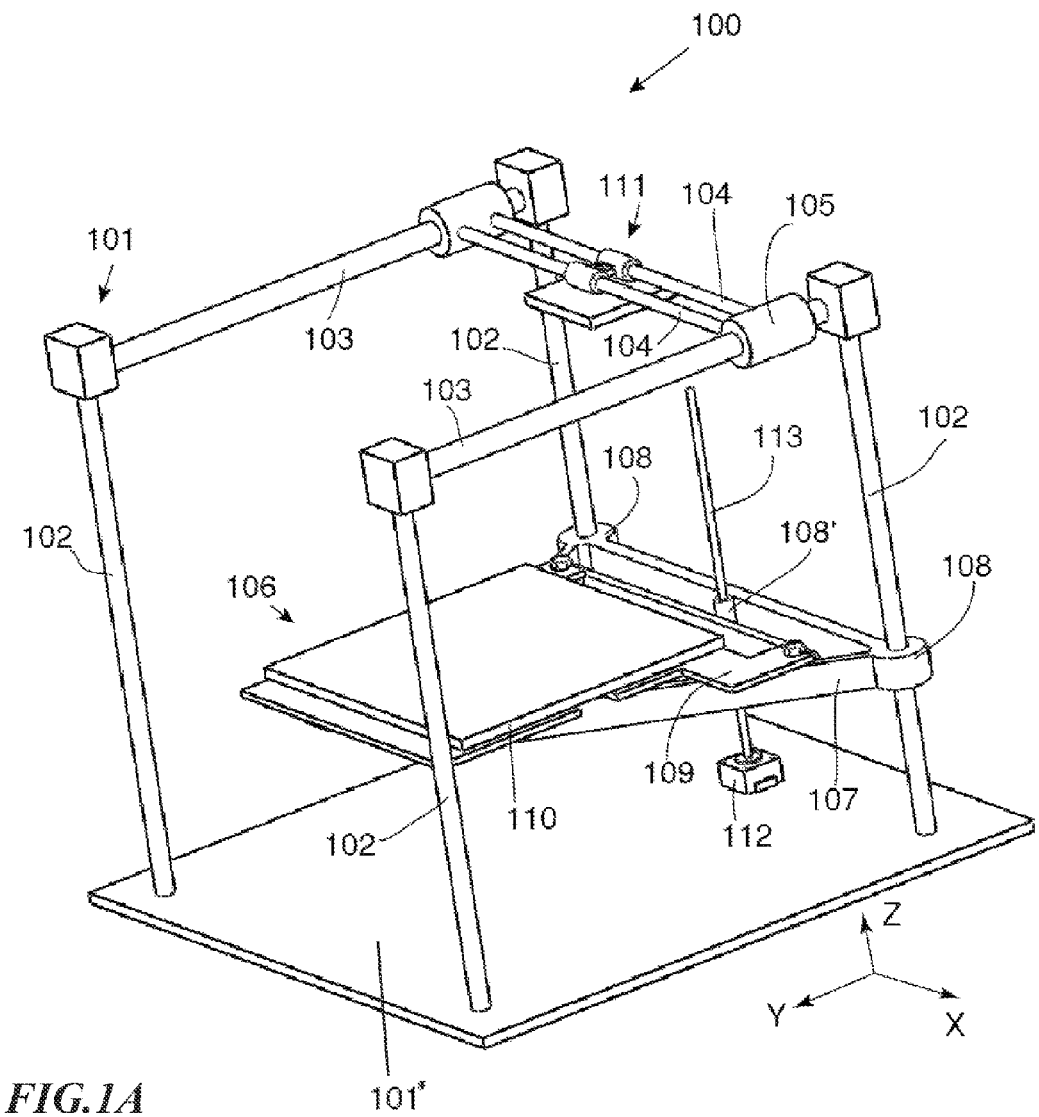
FIG. 1A illustrates a perspective view of a 3D printing apparatus, according to an embodiment herein.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a 3D printing apparatus. The apparatus comprises a base platform and a support frame mounted on the base platform. The support frame comprises a plurality of platform supports mounted on the base platform. The plurality of platform supports comprises a first set of platform supports and a second set of platform supports. The first set of platform supports is extended along a first direction, and the second set of platform supports is extended along a second direction. The printing apparatus further comprises a build platform movably supported on the first set of platform supports. The build platform comprises a bed support frame, a motor mount and a bed. The motor mount is supported on the bed support frame and the bed is mounted on the bed support frame. The bed is arranged above the motor mount. The bed is a planar surface. The printing apparatus still further comprises a print head movably supported on the second set of platform supports through a print head support. The print head support is coupled to the second set of supports. The print head support is moved along the second set of supports. The print head defines an axis where the axis of the print head intersects the planar surface of the bed. The bed and the print head are moved with respect to each other. A sensor device and/or a reflective surface is provided on at least one of the print head and/or the bed. The sensor device and the reflective surface are provided respectively on the print head and the bed and vice versa. The sensor device comprises a plurality of photo detectors and at least one light source. The light source is configured to transmit a beam of light toward the reflective surface. A reflected beam of light from the reflective surface is directed toward the plurality of photo detectors, and each photo detector is configured to detect a reflected beam of light. The plurality of photo detectors is arranged in a plurality of concentric circles formed around the light source.

According to an embodiment herein, the print head is moved with respect to the bed in any one of the first direction, the second direction and a third direction. The second direction is perpendicular to the first direction and the third direction is perpendicular to both the first direction and the second direction.

According to an embodiment herein, the bed is movable with respect to the print head in any one of the first direction, the second direction and a third direction. The second direction is perpendicular to the first direction and the third direction is perpendicular to both the first direction and the second direction.

According to an embodiment herein, the plurality of photo detectors are arranged in an array.

According to an embodiment herein, each photo detector of the plurality of photo detectors is spaced from an adjacent photo detector by a preset distance.

According to an embodiment herein, the at least one light source is selected from a group consisting of a bulb, Light Emitting Diode (LED), Laser, and a luminescent source. The light source is configured to produce a single or multiple wavelengths and/or frequencies of light. The light is any one of a visible light, infrared light, and ultraviolet light. The preferred light source is an infrared Light Emitting Diode (IrLED).

According to an embodiment herein, the photo detector is an electro-optical element configured to detect an optical property of the reflected light. The optical property of the reflected light includes a threshold quantity and intensity of the reflected light.

According to an embodiment herein, the photo detector is selected from a group comprising of a photoresistor, photovoltaic cell, a photo diode, a photo transistor, and a charged coupled device (CCD).

According to an embodiment herein, the photo detector is a light source and the LED is configured both as the light source and the photo detector.

According to an embodiment herein, the photo detector is activated by the reflected beam of light. The photo detector is activated based on a variation in electrical property of the electro-optical element due to the reflected beam of light. The variation in electrical property of the electro-optical element includes a variation in resistance in a photo resistor and a variation in current in a photodiode and photo transistor.

According to an embodiment herein, the light source is activated before starting an operation of the print head or during the operation of the print head or after completing the operation of the print head.

According to an embodiment herein, the sensor device is provided on a self-contained element. The self-contained element is a chip or wafer or an integrated circuit board.

According to an embodiment herein, the sensor device is formed integrally with the print head during a manufacturing of the print head or the sensor device separately coupled to the print head after the manufacturing of the print head or the sensor device is integrated as a kit to the print head.

According to an embodiment herein, the photo detectors are arranged in concentric circles to identify and ensure that the reflective surface of the bed is arranged in parallel to a surface of the sensor device and the reflective surface of the bed is perpendicular to a nozzle axis of the print head.

According to an embodiment herein, the 3D printing apparatus further comprises a plurality of step motors mounted on the motor mount. The plurality of step motors is operated to move the bed, to suppress the vibration forces on the bed and to inhibit damage to an exposed surface of the bed. The step motors is provided with a screw driver or hydraulic apparatus to exert an axial force on the bed. The step motors is provided with a buffering element to suppress the vibration forces on the board and to inhibit damage to an exposed surface of the bed. The buffering element is a cap or adapter.

According to an embodiment herein, the plurality of step motors is communicatively coupled with the plurality of photo detectors.

According to an embodiment herein, each step motor of the plurality of step motors is laterally offset from a center of mass of the bed.

According to an embodiment herein, the plurality of step motors are operated based on a point at which the reflected beam of light from the bed strikes the sensor device to correct any tilt of the print head with respect to a body of the print head so that a relative angle of the tilt of the bed with respect to the print head is zero, and the irradiance intensity at any point with a same distance from the light source is same.

According to an embodiment herein, the plurality of stepper motors and the sensor device form a levelling mechanism to control a tilt of the bed with respect to the print head.

According to an embodiment herein, the 3D printing apparatus further comprises a processor with a control board electrically coupled to the sensor device and the step motors to control an operation of the step motors based on an output from the photo detectors to control a movement and operation of the print head.

According to an embodiment herein, the processor is loaded with an algorithm to calculate a positional information associated with each photo detector of the plurality of photo detectors.

According to an embodiment herein, the processor is loaded with a software program to calculate a value θ, and wherein θ is defined as θ=arctan (LP/LZ), and wherein LP is a distance measured from the light source to a location on the sensor device, and wherein LZ is a distance measured from the light source to a plane of the bed.

According to an embodiment herein, the processor identifies an electrical signal produced by at least one photo detector of the plurality of photo detectors based on pre stored instructions.

According to an embodiment herein, the processor compares the electrical signal produced by the two different photo detectors of the plurality of photo detectors to detect the positional information of the photo detectors and to detect whether the sensor device is parallel to the reflective surface.

According to an embodiment herein, the 3D printing apparatus further comprises a polar sensor board communicatively connected to the plurality of step motors to control an operation of the plurality of the step motors to achieve a desired movement of the bed based on an output of the plurality of photo detectors and pre stored look-up table.

The various embodiments herein provide a three dimensional (3D) printing apparatus with a sensor device. The sensor device is configured for determining and adjusting a spatial parameter between a working surface of the 3D printing apparatus and a printer head. The sensor device employs photo detection method for determining a desired orientation of the working surface of the 3D printing device upon which the 3D object is formed.

FIG. 1A illustrates a perspective view of the 3D printing apparatus, according to an embodiment herein. With respect to FIG. 1A, the printing apparatus 100 comprises a support frame 101, a build platform 106 and a print head 111. The printing apparatus 100 is mounted on a base platform 101'. The base platform 101' is placed on another suitable surface, such as a floor. Alternatively, the printing apparatus 100 is directly placed on the surface, such as the floor. The support frame 101 is configured to assist in providing a movement to the build platform 106. The support frame 101 comprises a plurality of platform supports 102 arranged in a spaced relationship with the build platform 106. The platform supports 102 are configured to provide a perimeter/peripheral structure within which the build platform 106 is at least partially supported. The platform supports 102 serve as a load-bearing function with respect to the build platform 106. As shown in FIG. 1A, at least four platform supports are adopted in an equidistant box or cage configuration of the support frame 101. It is understood that, in the embodiments herein, one or more platform supports 102 are arranged in any suitable configuration (for example, a pyramidal or domed arrangement rather than rectangular as shown in FIG. 1A) to at least partially support the build platform 106. Further, a pair of laterally opposed platform supports 102 are interconnected at the respective top ends by a plurality of horizontal supports 103. Further, as shown in FIG. 1A, platform supports 113, configured as screw threads which threadably engages with couplings 108' and thereby allowing the movement of components. The motor drive 112 is connected to platform supports 113, which rotates platform supports 113 to achieve a vertical movement (Z direction). The print head 111 is coupled with the support frame 101 and is configured for defining an axis of orientation for the built platform. A plurality of print head supports 104 which hold the print head 111 are configured to slide along the horizontal supports 103, thus providing a movement to the print head 111. The print head support 104 comprises a slide bushing 105 on its either end so as to engage with horizontal supports 103 in a rail-type fashion. A guiding structure is provided by the horizontal supports 103, thereby allowing the print head support 104 to move along the horizontal supports 103 on the slide bushings 105 in a lateral direction, which is parallel to an Y-axis associated with the 3D printing apparatus 100 (as shown in FIG. 1A).

Figure 1B:
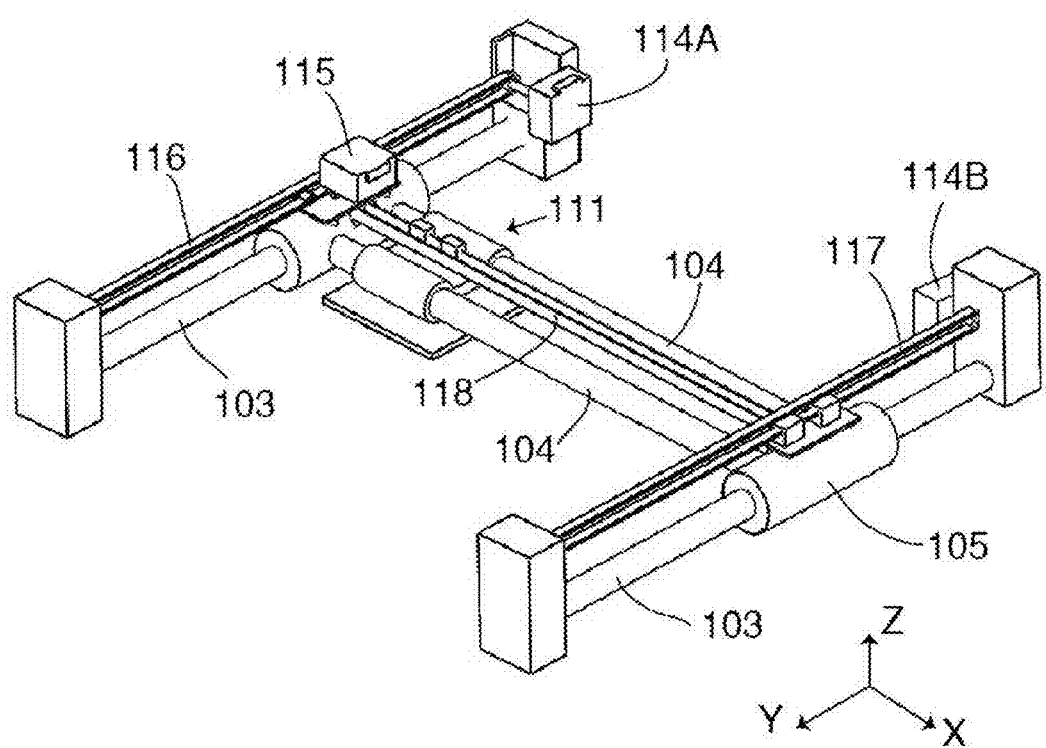
FIG. 1B illustrates a schematic view of a print head x and y motion apparatus of the 3D printing apparatus, according to an embodiment herein.
Figure 1C:
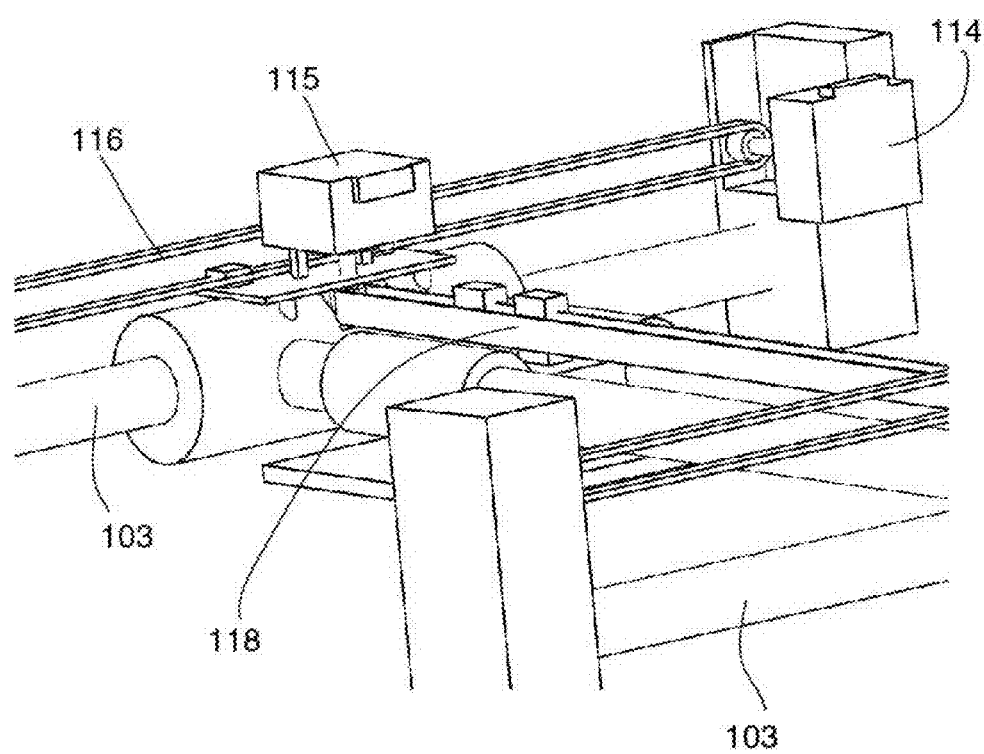
FIG. 1C illustrates a close-up schematic view of a print head x and y motion apparatus of the 3D printing apparatus, according to an embodiment herein.

As shown in FIG. 1B, the print head 111 is configured to slide along the print head support rails 104 so that the print head 111 is movable in a lateral direction parallel to an X-axis, where the X-axis is transverse to the Y-axis. Thus, the print head support 104 comprises a belt driven configuration 118 so that the rotation of motor 115 causes a movement of the print head 111 in a direction parallel to the X-axis. As shown in the FIG. 1B, the horizontal support pair 103 comprises a belt driven 116 and 117 so that upon the rotation of drive motor 114A and 114B, the print head 111 moves along the horizontal supports 103, in a direction parallel with the Y-axis. Additionally or alternatively, the print head support 104 if threaded allows the rotation of the print head support 104, thereby causing the print head 111 to move laterally along X-axis the print head support 104. The various mechanisms are operated before or after or during the operation of print head 111 based on a plurality of control signals output from the controller. In the embodiments herein, the print head 111 is supported in another configuration complementary to the horizontal supports 103 so that the print head 111 is allowed to move across a portion of 3D printing apparatus 100. For example, the print head 111 is diagonally moved, tilted, and/or rotated with respect to the remainder of a printing apparatus 100.

Further considering FIG. 1A, the build platform 106 comprises a bed support 107 for supporting a motor mount 109 and a bed 110. The bed support 107 is a load-bearing frame that is coupled to the platform supports 113. The bed support 107 comprises a plurality of threads which allows the rotation of the platform supports 113 by the drive motor or any other actuating device. The bed support 107 (and the motor mount 109 and the bed 110 supported thereon) is raised and lowered along the 3D printing apparatus 100 in a vertical direction defined by a Z-axis that is orthogonal to both the X- and Y-axes, as explained further herein. The build platform 106 is raised and lowered along the Z-axis with respect to the print head 111, while the print head 111 is moved in the lateral direction of X- and Y-axes with respect to the build platform. Thus, the print head 111 and the build platform 106 are coordinated to move along an interior volume of 3D printing apparatus 100 and the interior volume is bounded by the platform supports 102, the horizontal supports 103, and the print head supports 104. In the embodiments herein, it is understood that the 3D printing apparatus 100 is allowed to have different configurations for enabling the movement of the print head 111 with respect to the build platform 106.

Figure 2:
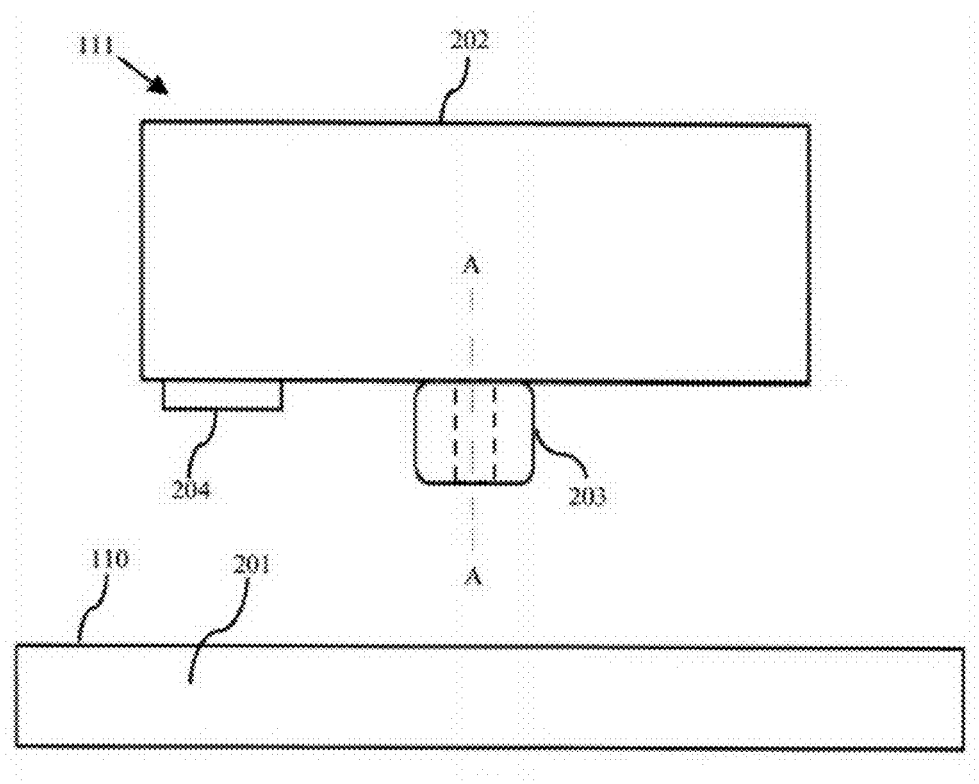
FIG. 2 illustrates a schematic view of a print head of the 3D printing apparatus, according to an embodiment herein.

FIG. 2 illustrates a schematic view of the print head 111 of the 3D printing apparatus 100, according to an embodiment herein. With respect to FIG. 2, the print head 111 comprises a body 202, a nozzle 203 extending from the body and at least one sensor device 204. The sensor device 204 is configured for determining a spatial parameter of the bed 110, for example: an orientation of the bed 110 relative to at least one component of the printing apparatus 100. An axis A of print head 111 is defined through a central portion of nozzle 203, as shown in FIG. 2. The nozzle 203 is an exit aperture for a compound that is extruded by the print head 111 during the course of a 3D printing operation. Accordingly, the nozzle 203 is oriented in a direction facing an intended surface for depositing materials from the print head 111 along a line parallel to the Z-axis, for example a direction extending towards the build platform. While the nozzle 203, in general, is orthogonally aligned to the remaining body 202 of the print heat, it is understood that the nozzle 203 is configured to have any desirable orientation and/or configuration relative to the remainder of print head 111. For example, the nozzle 203 is allowed to be embedded within the body 202 of the print head 111 and the nozzle 203 is fixed and/or is adapted to articulate relative to the body 202 of print head 111. The nozzle 203 is further configured to facilitate the flow of a material there through, onto the bed 110 of the build platform 106. For example, the material can be a hardened material such as acrylonitrile butadiene styrene (ABS), polycarbonate, and polylactic acid (PLA) and like. Since the build platform 106 is configured to move in a direction parallel to the Z-axis, the print head 111 is moved laterally in the directions parallel to the X- and/or Y-axes along the supports 103 and 104, in a reciprocating manner such that a layered object is produced by an iterative passes of the print head 111 over the bed 110. Accordingly, the build platform 106 is lowered away from the print head 111 as a layered 3D object of increasing height is produced by the print head 111. Thus, in addition to the movement of build platform 106, the print head 111 is accordingly raised and/or lowered relative to the print head 111.

According to an embodiment herein, a plurality of functions (for example, movement of print head 111 and/or extrusion of material through nozzle 203) of the 3D printing apparatus 100 is controlled partially or entirely by the computer controller. Accordingly, the 3D printing apparatus 100 is connected to a non-transitory computer-readable medium on which a plurality of instructions are stored and the stored instructions on the computer readable medium is read by one or more processors to carry out the plurality of functions for the 3D printing apparatus 100. Thus, a computer implemented method is also provided to control the operation of the 3D printing device.

Figure 3A:
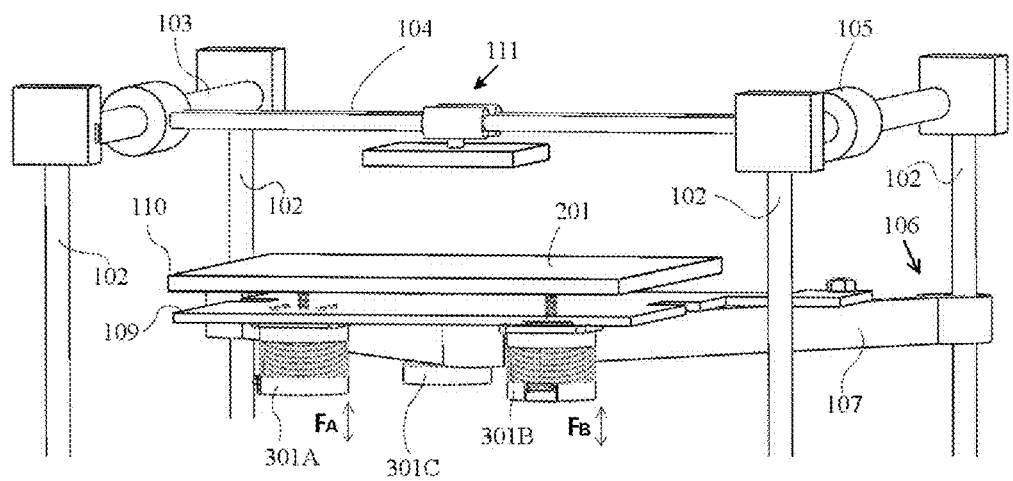
FIG. 3A illustrates a perspective view of a build platform of the 3D printing apparatus, according to an embodiment herein.
Figure 3B:
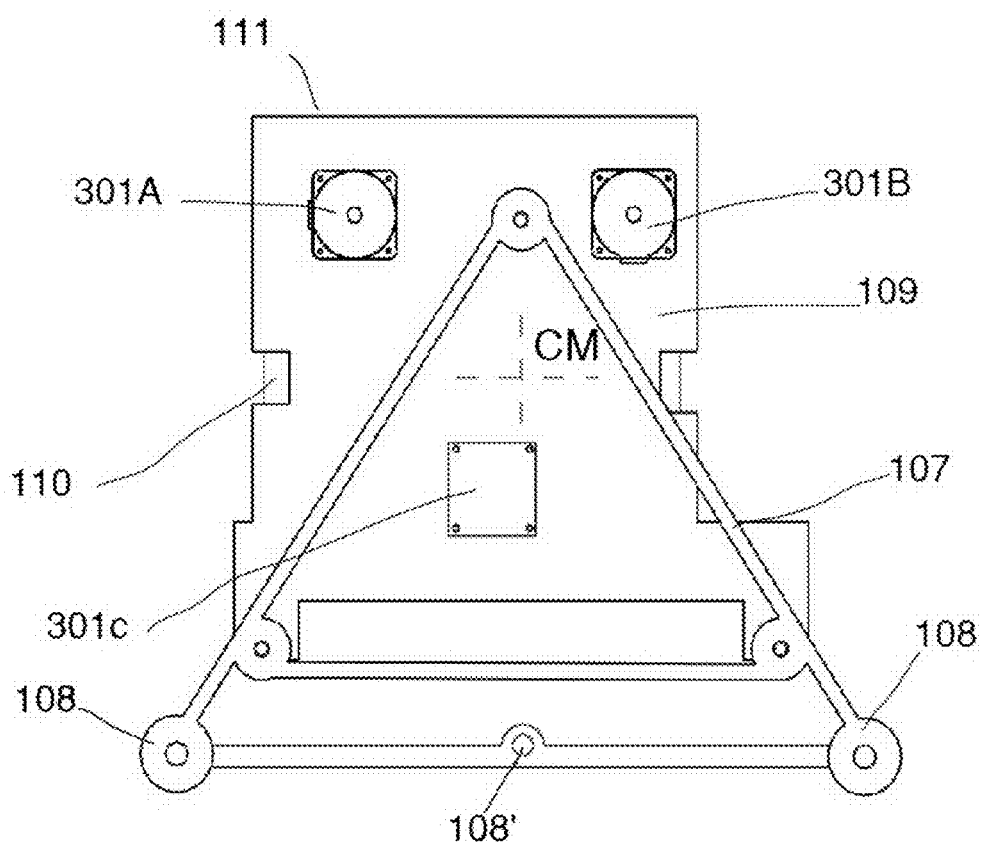
FIG. 3B illustrates a bottom plan view of the build platform of the 3D printing apparatus, according to an embodiment herein.

FIG. 3A illustrates a perspective view of the build platform 106 of the 3D printing apparatus 100 and FIG. 3B illustrates a bottom plan view of the build platform 106 of the 3D printing apparatus 100, according to an embodiment herein. The bed support 107 of the build platform 106 is a load-bearing frame configured to support the weight of at least a motor mount 109 and the bed 110. The bed support 107 is coupled with the motor mount 109 via screws, bolts, or another suitable type of coupling or fasteners. Accordingly, the bed support 107 is manufactured with a substantially rigid material, such as a metallic or composite material, and is coupled to the platform supports 102 to transfer the axial loads thereto. While the bed support 107 is shown with a triangular-shaped body/frame configuration coupled with at least three platform supports 102 at the three respective vertices in FIG. 3B, it is understood that the bed support 107 is configured to have any suitable configuration and be coupled to the platform supports 102 in any suitable combination. The bed support 107 is coupled to the platform supports 102 couplings 108. The couplings 108' is configured as cylindrical members having a threaded vertical bore there through so that the rotation of the platform supports 113 causes the respective couplings 108' and the portion of bed support 107 to move upwardly or downwardly in a vertical direction parallel to the Z-axis.

According to FIG. 3A and FIG. 3B, the motor mount 109 is adapted to support a plurality of step motors 301A and 301B and a hex stand 301C that is referenced as a fake motor. The hex stand is stationary. The plurality of step motors 301A and 301B is operated to raise and/or lower the bed 110. Accordingly, the motor mount 109 comprises one or more power and/or control pathways, such as in a printed circuit board, to transfer electrical signals to the step motors. The step motors 301A and 301B comprise a screw driver hydraulic system configured to exert an axial force along a direction parallel to the Z-axis on the bed 110. The step motors 301A and 301B further comprise a buffering member such as a cap or adapter so as to dampen the vibration forces and to inhibit a damage to an exposed surface of the bed 110.

As shown in FIG. 3B, the step motors 301A and 301B and the hex stand are offset from a center of mass (CM) of the bed 110. The offset enables the forces exerted by step motors in the Z-axis to cause the rotation about X-axis or Y-axes or along both the X and Y axes. In regard to the build platform 106, a moment arm is formed between the respective step motor 301A or 301B and the center of mass CM by a preset distance. The moment arm enables to tilt the bed 110 via rotation about the X- and/or Y-axes extending through the center of mass CM. In the embodiments herein, it is understood that the bed 110 is moved by one or more step motors to achieve any configuration or a desirable configuration or placement.

As shown in FIGS. 3A and 3B, the bed 110 is a substantially flat, planar member that defines a working surface 201. The working surface 201 is suitable for receiving one or more materials deposited by the nozzle 203. Accordingly, the working surface 201 comprises a finished, tactile, or otherwise a treated surface to facilitate the deposition, maintenance, and/or removal of the material deposited by the nozzle 203. In accordance with an embodiment herein, the working surface 201 or a portion thereof, is at least partially reflective so that a directed beam of light is at least partially reflected away from the working surface 201.

Additionally, a reflective surface is mounted on the working surface 201 via a coupling or surface treatment like lamination. The reflective surface is preferably mounted parallel to the working surface 201. Alternatively, the reflective surface is mounted at any known angle of inclination with respect to the working surface 201.

Figure 4:
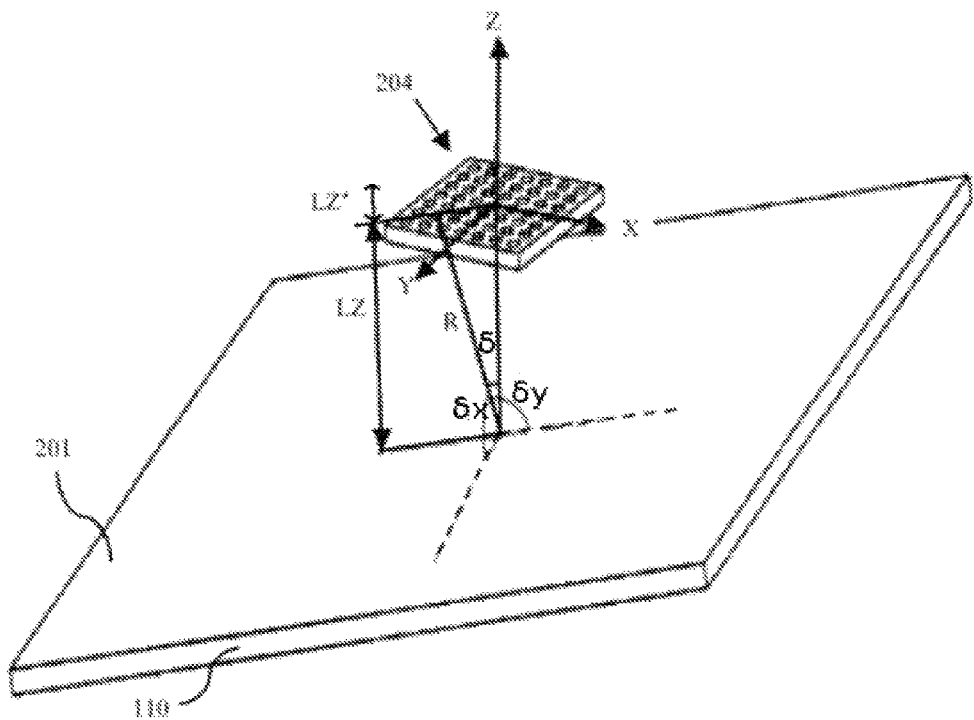
FIG. 4 illustrates a perspective view of a portion of the print head and the build platform of the 3D printing apparatus during a measurement of a spatial parameter of the build platform, according to an embodiment herein.

FIG. 4 illustrates a perspective view of a portion of the print head 111 and build platform 106 of the 3D printing apparatus 100 during measurement of a spatial parameter of the build platform, according to an embodiment herein. The 3D printing apparatus 100 employs the sensor device 204 for determining the spatial parameter of the working surface 201 relative to the print head 111. With respect to FIG. 4, the sensor device 204 comprises at least one light source surrounded by a plurality of photo detectors. The sensor device 204 is configured to be positioned on a self-contained element, for example, a chip or wafer. The sensor device 204 is a kit to be mounted on the print head or is integrally associated with the print head 111 during manufacture. Alternatively, the device is retrofitted to a pre-manufactured print head 111 or other component of 3D printing apparatus 100. The sensor device 204 is oriented in a manner such that the light source is directed towards the working surface 201 of the bed 110.

The sensor device 204 is further oriented so the light source is directed toward the reflective surface mounted on the working surface 201. In the embodiments herein, the sensor device 204 is facilitated to have different configurations or orientations.

The photo detectors are electro-optical elements configured to detect the properties of light (such as a threshold quantity, intensity, and the like) and provide an indication of the same. Accordingly, the photo detectors are variable resistive elements that present an electrical resistance within an electrical circuit corresponding to a property of light incident thereto or a photodiode where the current through the photodiode is varied in proportional to the intensity of the light beam or a phototransistor where the intensity of the light is inference or indicated by a Collector current Ic. In the embodiments herein, the presence of a reflected beam of light (as contrasted to ambient light) enables an activation of one or more of photo detectors by changing the electrical properties (such as variation in resistive property for photo resistor, variation in current property for Diode and Phototransistor) of the photo detector.

Figure 5A:
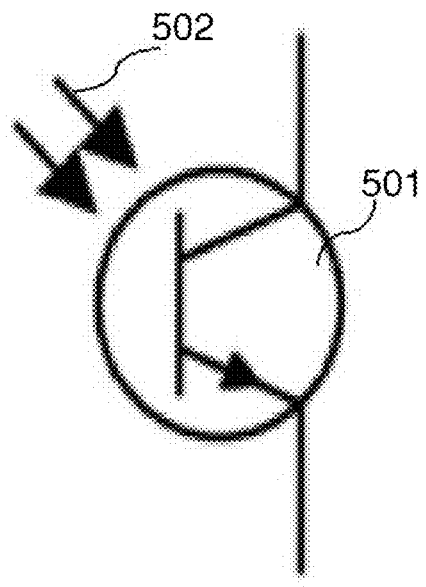
FIG. 5A illustrates a phototransistor used as a photo detector in the sensor device of the 3D printing apparatus, according to an embodiment herein.
Figure 5B:
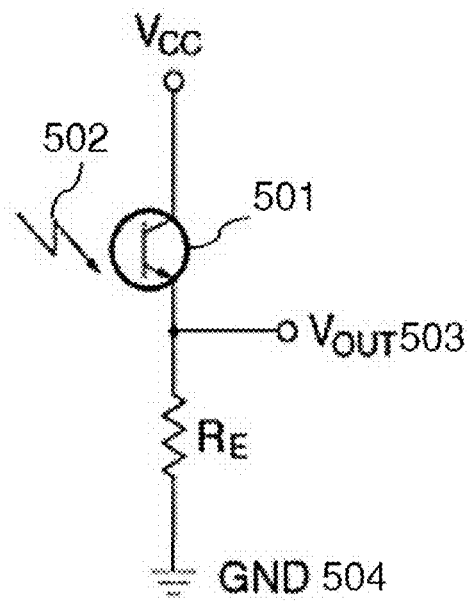
FIG. 5B illustrates a circuit diagram of a photo detector circuit with phototransistor, in the sensor device of the 3D printing apparatus, according to an embodiment herein.

FIG. 5A illustrates a phototransistor used as a photo detector in the sensor device of the 3D printing apparatus, according to an embodiment herein. The phototransistor 501 is used as the photo detector configured to receive the reflected beam of light 502 from the reflective surface and accordingly change the collector current of the transistor 501. FIG. 5B illustrates a block circuit diagram a photo detector circuit with phototransistor 501 where the collector current is reflected in voltage Vout 503, Vout 503 is analyzed by the controller to detect misalignment of the print head 111 with respect to the work surface 201, in the sensor device of the 3D printing apparatus, according to an embodiment herein. The use of the phototransistor is to reflect a change in the light intensity in a voltage output $V_{OUT}$ 503 across a resistor $R_E$ 504.

Figure 6:
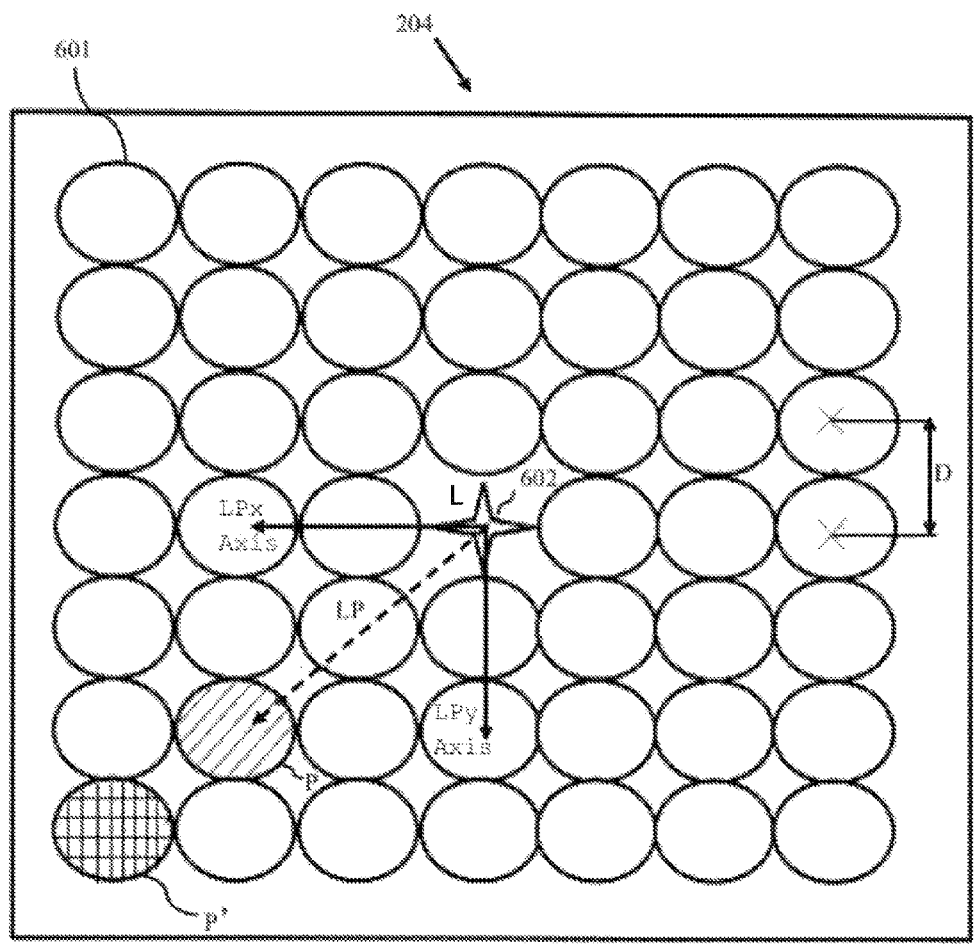
FIG. 6 illustrates a bottom view of the Cartesian sensor device of the print head during the measurement of a spatial parameter, in the 3D printing apparatus according to an embodiment herein.

FIG. 6 illustrates a bottom view of the sensor device 204 of the print head 111 during the measurement of a spatial parameter, according to an embodiment herein. With respect to FIG. 6, the photo detectors 601 are arranged in an array or grid having a uniform distance D between the adjacent photo detectors 601. The arrangement of photo detectors 601 provides an array of uniformly spaced sensors along the sensor device 204 such that the planar surface is mapped along a plane extending along the directions of the X- and Y-axes.

Referring to FIG. 6, the light source 602 is configured to emit a directed and coherent beam of light towards the working surface 201 of bed 110. Accordingly, the light source 602 is for example, a bulb, LED, laser, laser diode, or other luminescent source. In the embodiments herein, the light source 602 is configured to produce a single or multiple wavelengths and/or frequencies of light, for example, visible, infrared, ultraviolet and the like.

Before, during, and/or after the operation of the print head 111, the light source 602 is activated to project a beam of light I towards the work surface 201 of bed 110. Accordingly, the beam of light I wherein I direction as going through the Z in −Z is directed along a path that is incident and intersected by the work surface 201. Since the work surface 201 comprise the reflective surface which is at least partially reflective, at least a portion of the beam of incident light I is reflected away from the work surface 201 and the reflective surface as a reflected beam of light R, as shown in FIG. 4.

As shown in FIG. 2, in an optimum case, the work surface 201 is placed in perpendicular relation to a print head axis A extending through the nozzle 203 of the print head 111. When optimally aligned, the sensor device 204 is disposed on the print head body 202 such that the beam of light R is reflected directly back toward the light source 602 along the path of its origin. The beam of light I strike the work surface 201 such that the reflected beam of light R is collinear with the incident beam of light I. In such a case, no reading is detected by the photo detectors 601. In the embodiments herein, the light source 602 is at least partially transparent to light such that a portion of the reflected beam of light R is detected by the photo detector embedded within or mounted behind the light source 602.

Figure 7:
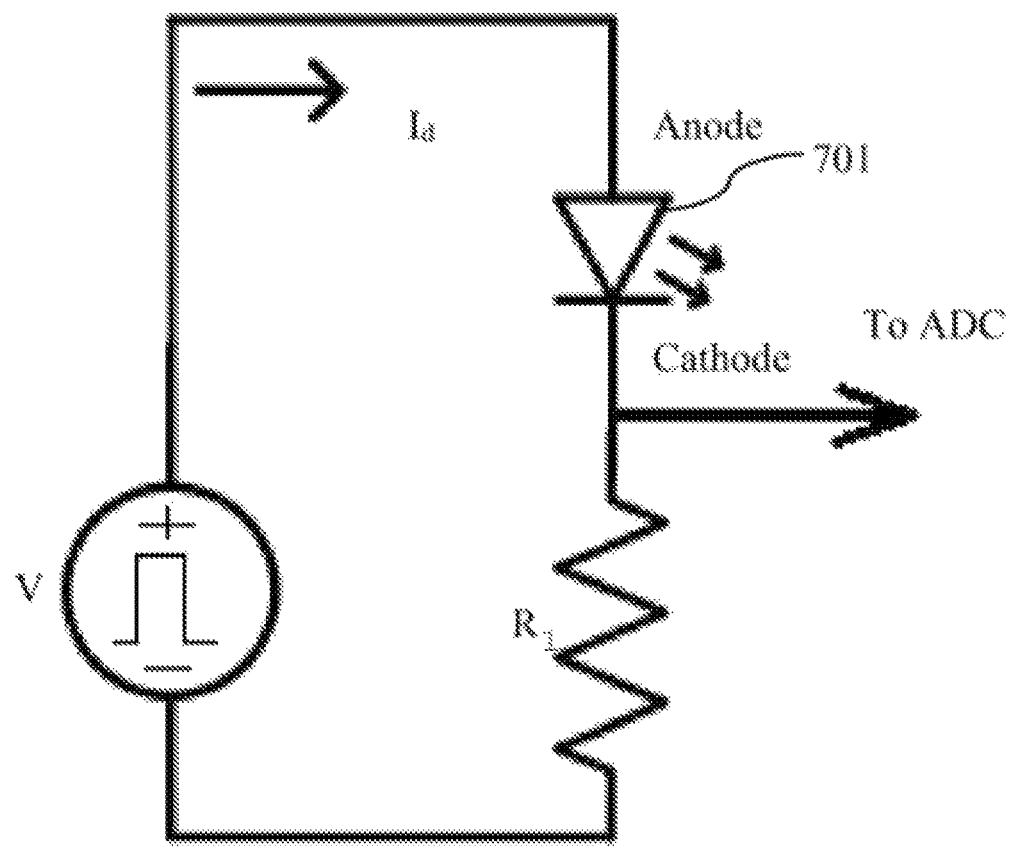
FIG. 7 illustrates a block circuit diagram of a photo detector with Light Emitting Diode used as a light source and a detector in the sensor device of the 3D printing apparatus, according to an embodiment herein.

FIG. 7 illustrates a block circuit diagram of a photo detector with Light Emitting Diode used as a light source and a detector in the sensor device of the 3D printing apparatus, according to an embodiment herein. In such a case, when a Light Emitting Diode (LED) 701 is placed parallel to the bed surface 110, the LED 701 emits and receives back a partial or entire reflected light. A detection of maximum reflected light indicates that the sensors are arranged in parallel to the work surface 201. The current generated by the diode 701 is directly proportional to an amount of the reflected light back. The current generated by the diode is in opposite direction to the power source current Id, thereby dropping the voltage across resistor $R_1$. Hence a pulsing of the LED light source 701 enables to read the effect of the bouncing light back in comparison to a no/nil light bouncing back condition to the LED light source 701.

With respect to FIG. 4, the bed 110 is tilted such that the work surface 201 is arranged at an oblique angle and not perpendicular to the print head axis Z. Thus, the work surface 201 is disposed in a manner such that the beam of light I is reflected away from the work surface 201 toward a location other than the light source 602. As a result, the reflected beam of light R travels along a path such that a nonzero angle of incidence δ is measured between the reflected beam of light R and the incident beam of light I. Such an orientation of the bed 110 is expected to present challenges to an effective operation of the 3D printing apparatus 100, for example, by allowing subsequent layers of material deposited on the bed 110 to be out of register with prior/previously deposited layers of material, thereby adversely affecting the quality of the printed object.

With specific reference to FIG. 6, the point P at which the reflected beam of light R strikes the sensor device 204 is determined through the readings provided by the photo detectors 601. When the photo detectors 601 are subjected to the directed beam of light such as the reflected beam of light R, an indication is provided by the detectors. For example, a voltage change is observed in the phototransistor circuit, when the light beam is incident on the phototransistor (shown in FIG. 5B). Accordingly, the photo detector at point P which receives the reflected beam of light R is configured to provide an identifying or corresponding reading, for example, by producing a reading in the absence of readings from other photo detectors 601, or by producing a uniquely higher reading than that of the remaining photo detectors 601. Since the distance D between the photo detectors 601 is a known quantity (uniform quantity or constant), the distance LP between the light source 602 and the point P is determined by using Pythagorean Theorem:

$$LP^2 = \sqrt{(LPx\text{-axis})^2 + (LPy\text{-axis})^2}$$

where LPx-axis is the distance between the light source 602 and the point P measured along the X-axis and LPy-axis is the distance between the light source 602 and the point P measured along the Y-axis.

As shown in FIG. 6, the distance LZ between the light source 602 and the plane of the work surface 201 along the Z-axis and the distance between the light source 602 and the point of incidence of the beam of incident light I to the work surface 201, is determined by one or more methods.

With reference to FIG. 4, the distance LZ is determined by measuring and calculating a distance LP between light source 602 and a second point P' at which the reflected beam of light R strikes working surface 201 after moving the bed 110 by a known incremental distance LZ'. The incremental distance LZ' is associated with, for example, a computer controlled movement of a component of 3D printing apparatus 100, such as the print head 111 or the bed 110 and the distance is measured by a scale or other measurement device. Since the position of the bed 110 is altered only along the Z-axis such that the bed 110 is substantially devoid of an additional tilt in the direction of the X- and Y-axes. In such case, the angle θ between the beams of light I and R remain unchanged during the movement of the print head 111 along the incremental distance LZ'. Further the distances LP and LP' are determined in the manner described above. Accordingly:

$$\tan(\delta) = LP/LZ \text{ and}$$

$$\tan(\delta) = LP'/(LZ+LZ').$$

Hence, LP/LZ=LP'/(LZ+LZ') where LP, LP' and LZ' are known values. So the distance (LZ) of the printhead 111 (specifically light source 602) from working surface 201 along the Z-axis is calculated. Since the distance LZ is calculated, tan δ=LP/LZ and hence δ=arctan (LP/LZ), where LP and LZ are known values.

Accordingly, both the distance between the print head 111 and the bed 110 (LZ), and the degree of tilt (δ) of the bed 110 relative to the Z-axis (e.g., the degree of tilt of the bed 110 relative to the axis A of print head 111) are determined. In the embodiments herein, it is understood that various combinations of trigonometric relationships are utilized to arrive at the calculations described above.

According to an alternative embodiment herein, at least one value of LZ is associated with a "home," "initial," or "reset" state of the 3D printing apparatus 100 such that the bed 110 is positioned at a known location in the Z-direction, for example, as an initial condition of 3D printing apparatus 100 and/or as positioned under automated control. In such embodiments, the calculation of the quantity LZ prior to identifying the tilt (δ) of the bed 110 is obviated or simplified.

Further referring to FIG. 3A, the build platform 106 comprises the step motor 301A and the step motor 301B that are each configured to exert an axial force on the bed 110. Further, the step motors 301A and 301B are laterally offset from the center of mass CM of bed 110 such that the axial force $F_A$ exerted by the step motor 301A on the bed 110 causes the rotation of the bed 110 about a line parallel to the X-axis. Further, an axial force $F_B$ exerted by step motor 301B causes the rotation of the bed 110 about a line parallel to the Y-axis. In this regard, the operation of the step motors 301A and 301B facilitates to move the bed 110 in a manner such that the angle θ of the bed 110 is varied with respect to a line parallel to the Z-axis.

Accordingly, once the value of the angle δ between the bed 110 and a line parallel to the Z-axis is calculated, the step motors 301A and 301B are activated to correct a tilt of the bed 110 with respect to the body 202 of print head 111. For example, the step motors 301A and 301B are activated to enable the bed 110 to move in a manner such that δ is reduced to substantially zero or another pre-determined value.

With respect to FIG. 4, the calculated angle δ is separated into component values along the X- and Y-axes. The angle $δ_x$ measured between the bed 110 and the Z-axis along the direction of the X-axis is determined. Further, the angle $δ_y$ measured between the bed 110 and the Z-axis along the direction of the Y-axis is determined. Since the distance LZ between the light source 602 and the bed 110, and the distances (LPx-axis, LPy-axis) at the point P from the light source 602 in the direction of the X- and Y-axes are known, the component angles $δ_x$, $δ_y$ is determined by using the trigonometric relationships:

$$δ_x = \arctan(LPx\text{-axis}/LZ) \text{ and } δ_y = \arctan(LPy\text{-axis}/LZ)$$

Once the component angles $δ_x$, $δ_y$ are calculated, the respective step motors A and B are activated, either by a manually or automatically. The activation of the step motors enable the bed 110 to raise and/or lower such that the bed 110 is in level with the body 202 of the print head 111, and the angles $δ_x$ and $δ_y$ [and therefore δ] are substantially reduced to zero. The forces $F_A$ and $F_B$ associated with the step motors A and B enable the movement of the bed 110 such that $δ_x$ and $δ_y$ are reduced to substantially zero, or else the angle $δ_x$ and $δ_y$ are adjusted to known values from a lookup table or a programmed data table.

According to an embodiment herein, the bed 110 is leveled with respect to the body 202 of the print head 111 in a different manner. The levelling is established without the quantification of degrees of the offset formed between the bed 110 and the respective axes. In one embodiment herein, a condition of tilt of the bed 110 is determined by the sensor device 204 through the activation of one or more of photo detectors 601. For example, a variation in property of one or more photo detectors 601 is adopted to indicate that the bed 110 is tilted. Further a condition, that the bed 110 is in level with the working surface, is indicated by no change in properties of any photo detectors 601. Further, the activation of each respective photo detector is associated with a known amount of tilt of the bed 110 at different distances LZ. The amount of tilt for the bed 110 is obtained through a lookup or programmable data table and/or through previous calibration of 3D printing apparatus 100. Accordingly, the activation of one or more photo detectors 601 is associated with a known "course correction". For example, the activation of one or more step motors enables the bed 110 to return to a leveled position. The leveled position is obtained when none of the photo detectors 601 is activated.

In the embodiments herein, it is well understood that the non activation condition of all the photo detectors 601 is associated with either a condition in which angle of incidence θ is substantially zero or a condition in which the reflected beam of light R is directed outside the perimeter of the sensor device 204. In such a case, the 3D printing apparatus 100 initiates a verification operation upon a non activated condition of all the photo detectors 601, and the bed 110 is tilted by a known distance through one or more of step motors A and B until one or more photo detectors 601 are activated. Such a known distance may correspond to the distance D between the photo detectors 601. Upon activation of one or more photo detectors 601, the bed 110 is tilted to its original position by one or more step motors. The bed 110 is further tilted by the known distance, for example distance D, in a direction opposite to the first tilt in the verification operation. On further activation of other photo detectors 601, the original position of the bed 110 is verified as the position in which angle of incidence θ is substantially zero. The bed 110 arranged in the original position causes the reflected beam of light R to strike the sensor device 204 at a location between the photo detectors 601, in which no photo detector is present, i.e., substantially at the location of light source 602. However, when no photo detector 601 is activated during either or both the first and second tilt operations of the bed 110, the original position of the bed 110 is fixed such that the angle of incidence θ has a preset value to cause the reflected beam of light R to pass through the sensor device 204 entirely.

According to an embodiment herein, the sensor device 204 is used to quantify a number of spatial relationships between the components of the 3D printing assembly, namely, the print head 111 and the bed 110. As such, this information is used to correct the positions and/or orientations of the components before, during, and/or after the use.

According to an embodiment herein, the 3D printing apparatus 100 adopts a levelling system comprising the sensor device 204 and at least one of step motors 301A and 301B, and/or any components to facilitate communication and/or control of the printing apparatus 100.

According to an embodiment herein, the sensor device 204 of the print head 111 is mounted on the working surface 201 or another portion of the bed 110 such that the incident beam of light I emitted by the sensor device 204 is directed toward a reflective portion of the print head 111. Accordingly, a reflected beam of light R is directed toward the sensor device 204. The relative angle of tilt of the bed 110 with respect to the print head 111 is detected and the position and/or tilt of the bed 110 is adjusted with the step motors so that the value of angle of incidence θ is substantially zero.

According to an embodiment herein, the printing apparatus 100 is configured such that the print head 111 is fixed and the bed 110 is configured for movement in the X, Y, and Z-directions. In such a case, the sensor device 204 is mounted to either the print head 111 or onto the bed 110, with a reflective surface positioned on the other side of the sensor device 204 or the print head 111. Prior to a 3D printing operation, the relative tilt between the bed 110 and the print head 111 is detected and corrected to ensure that the plane of the bed 110 is perpendicular to the axis A of the print head 111 and the value of angle of incidence θ is substantially zero.

According to an embodiment herein, the printing apparatus 100 is configured such that the bed 110 is fixed or moveable between a series of pre-determined positions. The step motors 301A and 301B are mounted to the print head 111 so as to enable the print head 111 to be adjusted in the X- and Y-directions. The adjustment enables the axis of the print head 111 to be perpendicular to the work surface of bed 110 so that the value of angle of incidence θ is substantially zero.

Figure 8A:
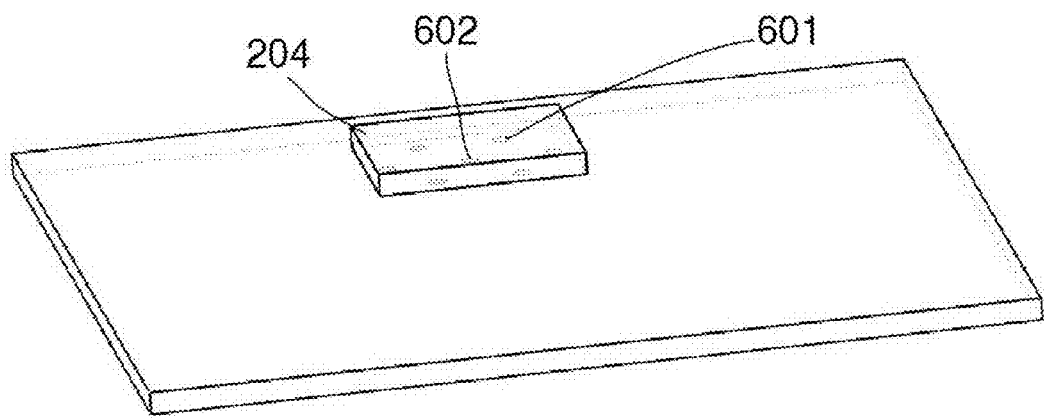
FIG. 8A illustrates a topside perspective view of a portion of the print head and build platform with polar sensor device in the 3D printing apparatus, according to an embodiment herein.
Figure 8B:
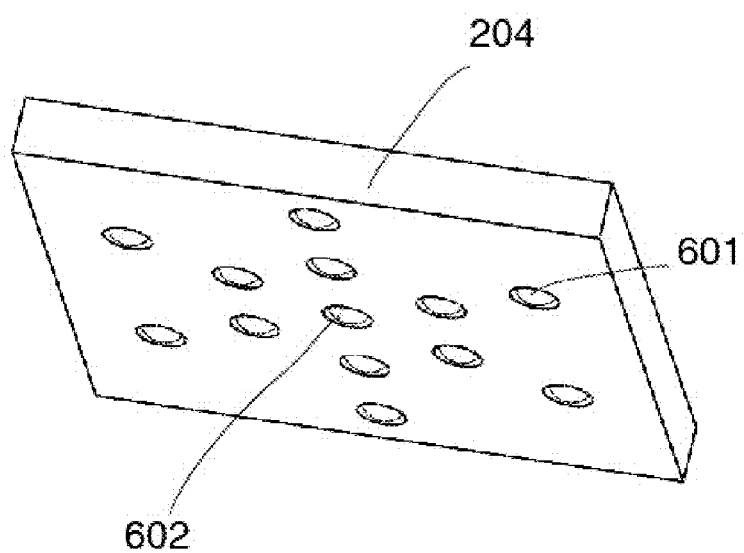
FIG. 8B illustrates a bottom side perspective view of a polar sensor board with two set of photo detectors arranged in two concentric circles in the sensor device of the 3D printing apparatus, according to an embodiment herein.
Figure 8C:
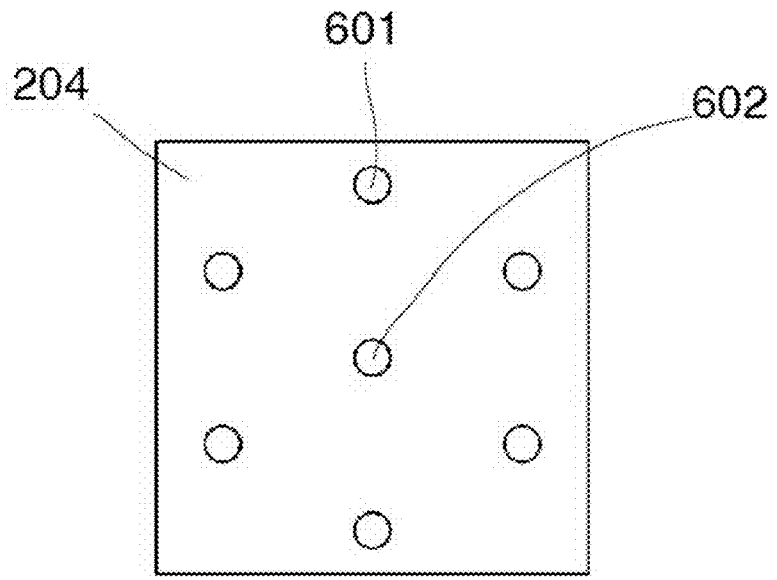
FIG. 8C illustrates an enlarged bottom view of a polar sensor board with a single set of photo detectors arranged in a circle in the sensor device of the 3D printing apparatus, according to an embodiment herein.
Figure 8D:
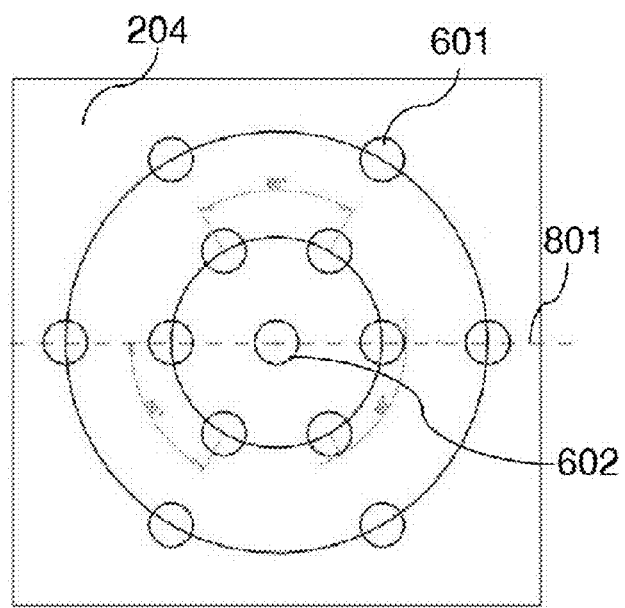
FIG. 8D illustrates a bottom view of the sensor device used in the 3D printing apparatus, according to an embodiment herein.
Figure 8E:
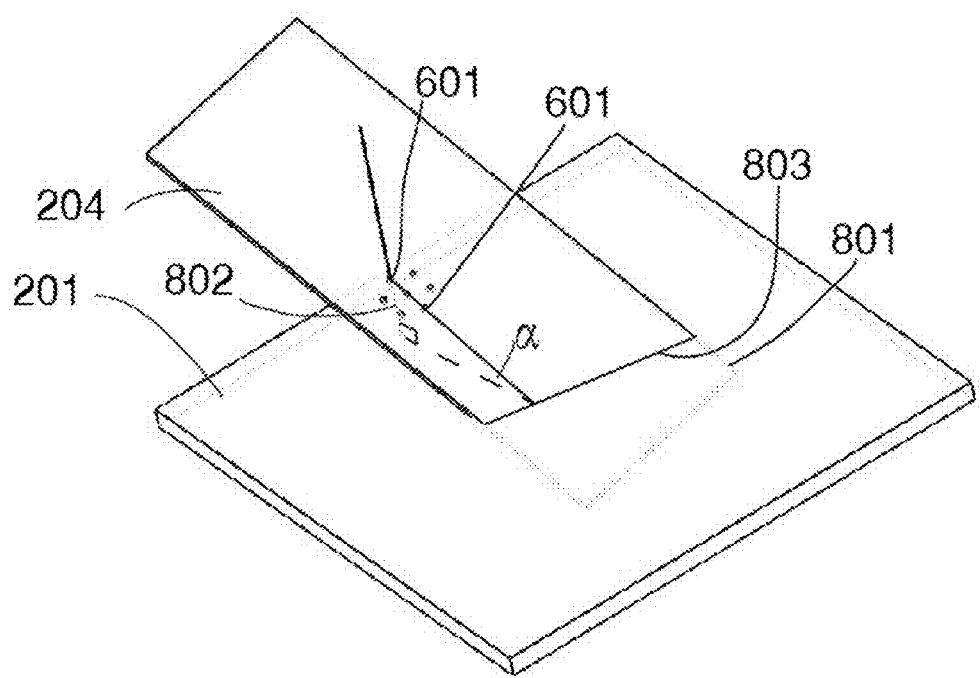
FIG. 8E illustrates a perspective view of a portion of the print head with the Polar sensor board plan extended to intercept the bed surface in the 3D printing apparatus, according to an embodiment herein.
Figure 8F:
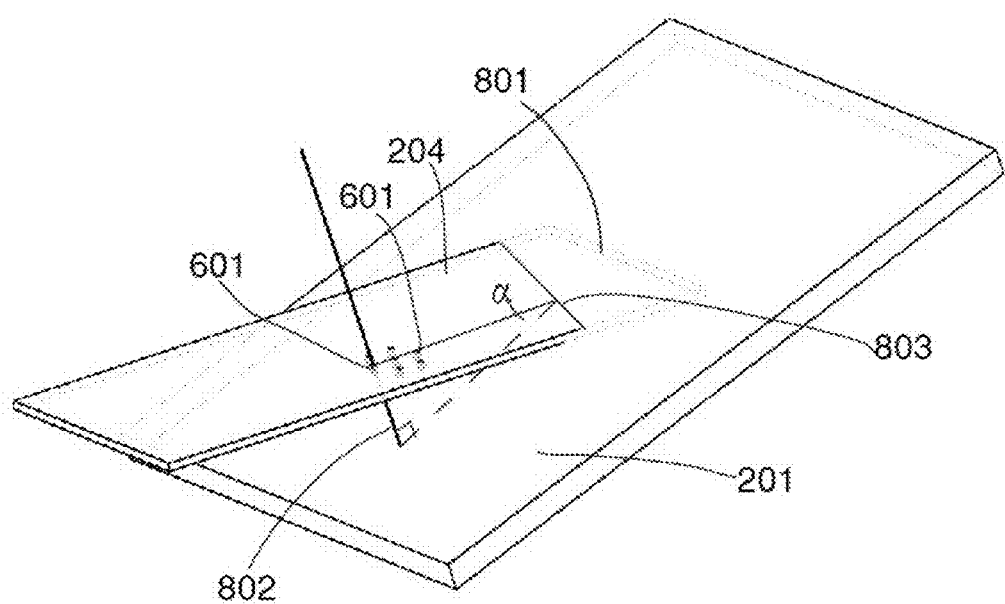
FIG. 8F illustrates is a side perspective view of a portion of the print head with the Polar sensor board plan extended to intercept the bed surface in the 3D printing apparatus, according to an embodiment herein.

FIG. 8A a top side perspective view of a portion of the print head and build platform with polar sensor device 204 in the 3D printing apparatus, according to an embodiment herein. FIG. 8B illustrates a bottom side perspective view of a polar sensor board with two set of photo detectors arranged in two concentric circles in the sensor device of the 3D printing apparatus, according to an embodiment herein. FIG. 8C illustrates an enlarged bottom view of a polar sensor board with a single set of photo detectors arranged in a circle in the sensor device of the 3D printing apparatus, according to an embodiment herein. FIG. 8D illustrates a bottom view of the sensor device used in the 3D printing apparatus, according to an embodiment herein. FIG. 8E illustrates a perspective view of a portion of the print head with the Polar sensor board plan intercepting the bed surface in an angle α where 802 is the normal to the working surface 201 from max irradiance intensity photodetector 601 where 803 is the intercepting line between the two surfaces in the 3D printing apparatus, according to an embodiment herein. FIG. 8F illustrates is a side perspective view of a portion of the print head with the Polar sensor board plan intercepting the bed surface in the 3D printing apparatus, according to an embodiment herein. With respect to the FIG. 8A and FIG. 8B, the photo detectors 601 are placed on along the concentric circles arranged to surround the light source 602. The photo detectors 601 are placed in their respective positions using the polar coordinates. This way, all the photo detectors 601 on the same circle are separated from the light source 602 by the same distance. When all the photo detectors 601 have the same reading, it indicates that the sensor device 204 is parallel to the work surface 201. In case any one of the photo detectors 601 on the circle has a lower reading, this indicates that the surface 201 is tilted and the photo diodes with the lower reading are further away from the work surface 201. The lower reading is attributed mostly to the increase in the angle of reflection with an effective intensity of ~Io*Cosine (θ+Δθ) where Io is maximum intensity in θ=0. Similarly, the higher photo detector reading reflects an effective intensity of ~Io*Cosine (θ−Δθ).

Further referring to FIG. 8A and FIG. 8C, the sensor device 204 comprises the plurality of photo detectors 601 surrounding the light source 602 in two circles and on the symmetry line. The sensor device 204 is placed on a self-contained element, for example, a chip or wafer, and is integrally formed with print head 111 either during manufacture or the sensor device is retrofitted to an already-manufactured print head 111 or other component of 3D printing apparatus 100. The sensor device 204 is oriented in a manner such that the light source 602 is directed toward the working surface 201 of bed 110.

With respect to the FIG. 8D, the sensor device 204 is positioned in such a manner that the symmetry line 801 of the sensor device 204 is about parallel to a symmetry line of the motors. The position ensures that motors' movement is reflected on one of the symmetry lines of the Sensor device 204. Such an adjustment is accomplished in a configuration wherein the sensor device 204 is mounted to the print head 111 and/or frame, and the corresponding reflective surface is mounted to the bed 110. In the embodiments herein, the sensor device 204 is mounted to the bed 110 and/or to a supporting portion thereof. A corresponding reflective surface is mounted on a portion of the print head 111. Alternatively, the sensor device 204 is mounted at a predetermined angle relative to the print head 111, with a reflective surface mounted on the bed 110 at a corresponding angle to the print head 111.

According to an embodiment herein, the 3D printing apparatus 100 comprises a plurality of polar sensors in communication with the step motors. The printing apparatus is configured to adopt an algorithm to level the work surface 201. A polar sensor board comprises the plurality of photo detectors 601 which are place along a pre-defined number of concentric circles.

Figure 9A:
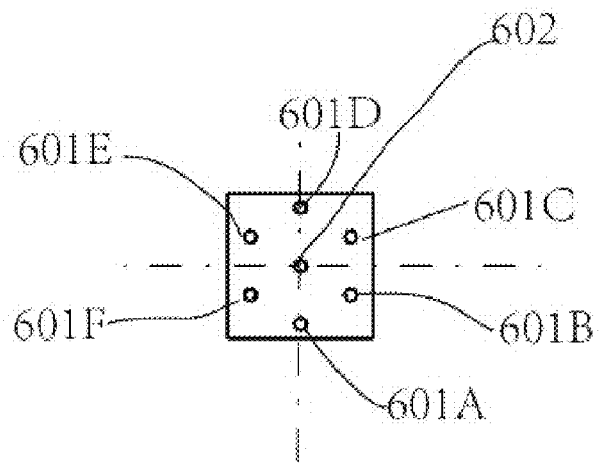
FIG. 9A illustrates a bottom side view of the sensor board with the photo detectors placed in a circular manner, in the 3D printing apparatus, according to an embodiment herein.
Figure 9B:
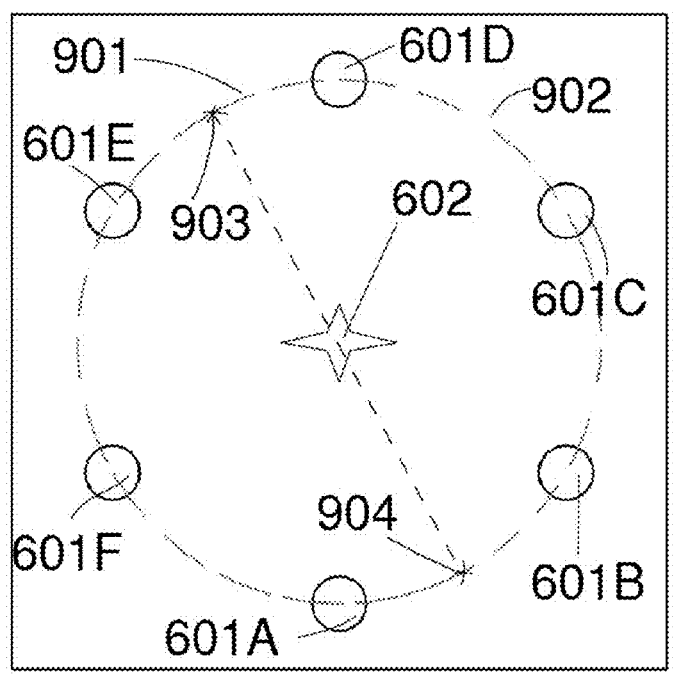
FIG. 9B illustrates a bottom side view of the polar sensor board with the photo detectors placed in a circular manner and a dashed line indicating an imaginary line passing from an area of minimum irradiance intensity to an area of maximum irradiance intensity, in the 3D printing apparatus, according to an embodiment herein.

FIGS. 9A and 9B illustrates a bottom view of the sensor board with the photo detectors 601 placed in a circular manner, according to an embodiment herein. As shown in FIG. 9A, the polar sensor board includes at least six photo detectors (P0-P5) 601A to 601F. The photo detectors 601 are placed in a circular manner around the light source 602. The readings from the photo detectors 601 are analysed to extract information reflecting tilt position required to control motors movements so as to make a correction in the alignment of the bed 110. There are 720 theoretical possibilities in which the photo detectors (P0) 601A through (P5) 601F are to be sorted so as to calculate the required motor movement. When the bed 110 is not leveled, the readings from the plurality of detectors (P0-P5) 601A-601F are not of the same values. In order to minimize the algorithms used for calculating the motor movements, the photo detectors 601 are divided into two groups such as a MAX group 901 and a MIN group 902, depending on the respective readings (As shown in FIG. 9B). The sorting of the reading received from the sensors always results in following conditions:

The MAX group 901 comprise the adjacent photo detectors with largest detectors reading, for example Pi−1, Pi and Pi+1.

The MIN group 902 comprise the adjacent photo detectors with smallest detector readings, for example Pj−1, Pj and Pj+1

The maximum reading within the MAX group 901 Pi−1, Pi and Pi+1 is given by the middle photo detector Pi. The middle photo detector in the MAX group 901 always has the largest reading than each of the adjacent photo detectors.

The minimum reading within the MIN group 902 Pj−1, Pj and Pj+1 is given by the middle photo detector Pj. The middle number in the MIN group 902 always has the smallest reading than each of the adjacent photo detectors.

The MIN group 902 and the MAX group 901 are located in opposite side of each other.

With reference to FIG. 9B, the possibilities of sorting the detectors are narrowed to 12, by grouping the detectors. Thereby the software algorithm used to analyze the actual probabilities is minimized.

By referring FIG. 9B, a MIN point 903 and a MAX point 904 which divides the sensor board falls outside the circle of the photo detectors 601A to 601F so that the sorting of the photo detectors 601 reading produces the MAX group 901 containing the detectors (P5, P0, P4) 601F, 601A and 601E and the MIN group containing the detectors (P2, P3, P1) 601C, 601D and 601B.

Figure 10:
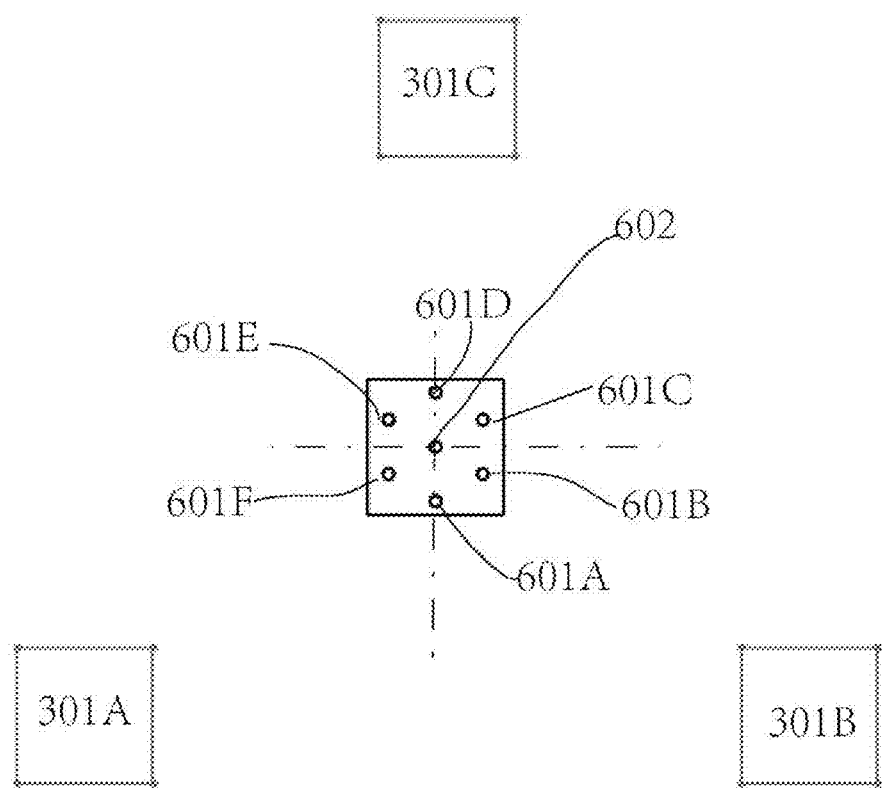
FIG. 10 illustrates a schematic arrangement of a polar sensor board with respect to the motors in the 3D printing apparatus, according to an embodiment herein.
Figure 11A:
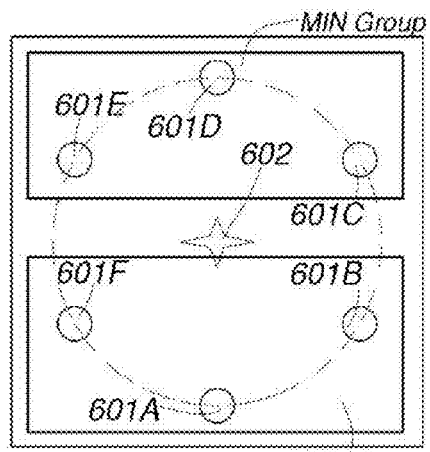
FIG. 11A-FIG. 11F illustrates a plurality of ways of arranging photo detectors receiving the maximum and minimum irradiance intensities in a polar sensor board for the sensor device in the 3D printing apparatus, according to an embodiment herein.
Figure 11B:
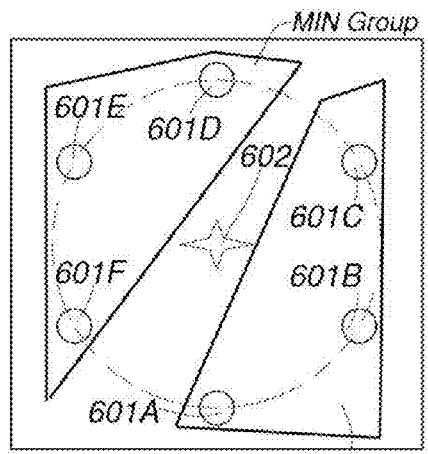
Figure 11C:
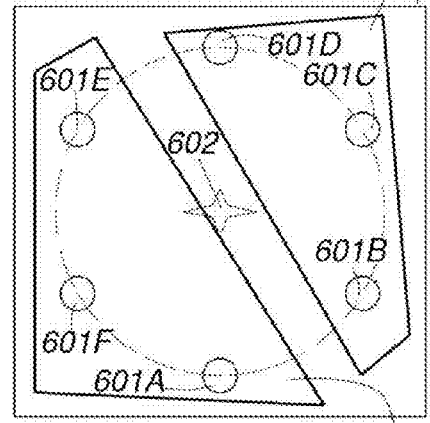
Figure 11D:
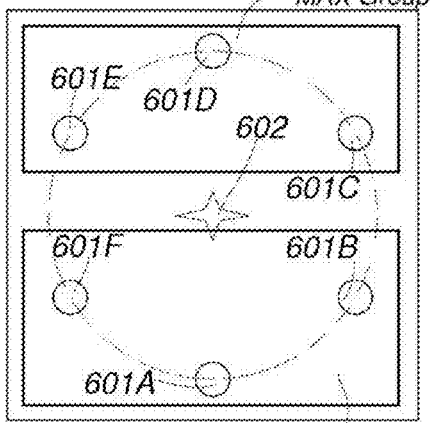
Figure 11E:
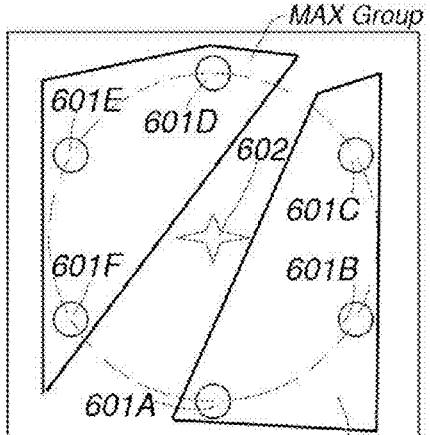
Figure 11F:
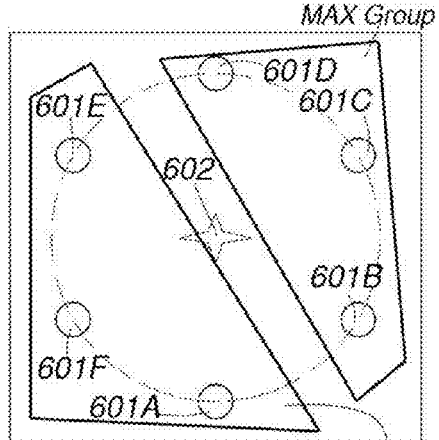

FIG. 10 illustrates a schematic arrangement of a polar sensor board with respect to the motors in the 3D printing apparatus, according to an embodiment herein. The polar sensor board 204, the step motor 301A, the step motor 301B and the fake motor (hex stand) 301C are positioned as shown in FIG. 10. FIG. 11A-FIG. 11F illustrates a plurality of ways of arranging photo detectors receiving the maximum and minimum irradiance intensities in a polar sensor board for the sensor device in the 3D printing apparatus, according to an embodiment herein. FIG. 11A-FIG. 11F illustrates a plurality of MAX and MIN group arrangement possibilities for calculating the motor movement requirements so as to correct the alignment of the bed 110, according to an embodiment of the present disclosure. With respect to FIG. 11A-11F, Table1 below lists the various MAX and MIN group arrangement possibilities along with the maximum detecting photo detector associating each group. Table 1 further lists the step motor movements associated with each group. For example, the first arrangement in the table (FIG. 11A) has the MAX group comprising detectors P5, P0, P1 and the MIN group comprising detectors P2, P3 and P4. The photo detector receiving maximum reading is P0. In this case of detector arrangement, the step motor A is moved downwards to align the bed 110 with the sensor board.

TABLE 1

| | Max group | Min group | Max | 2nd Max | Motor 1 | Motor 2 | FIG. 11 |
|---|---|---|---|---|---|---|---|
| 1 | P5, P0, P1 | P2, P3, P4 | P0 | P5 | DOWN | | A |
| 2 | P5, P0, P1 | P2, P3, P4 | P0 | P1 | | DOWN | A |
| 3 | P0, P1, P2 | P3, P4, P5 | P1 | P0 | | DOWN | B |
| 4 | P0, P1, P2 | P3, P4, P5 | P1 | P2 | | DOWN | B |
| 5 | P1, P2, P3 | P4, P5, P0 | P2 | P1 | UP | | C |
| 6 | P1, P2, P3 | P4, P5, P0 | P2 | P3 | UP | | C |
| 7 | P2, P3, P4 | P5, P0, P1 | P3 | P2 | UP | | D |
| 8 | P2, P3, P4 | P5, P0, P1 | P3 | P4 | | UP | D |
| 9 | P3, P4, P5 | P0, P1, P2 | P4 | P3 | | UP | E |
| 10 | P3, P4, P5 | P0, P1, P2 | P4 | P5 | | UP | E |
| 11 | P4, P5, P0 | P1, P2, P3 | P5 | P0 | DOWN | | F |
| 12 | P4, P5, P0 | P1, P2, P3 | P5 | P4 | DOWN | | F |

A part of pseudo-code on the bed 110 leveling algorithm is explained below:

```
while !( bed_leveled( P[0],P[1],P[2],P[3],P[4],P[5]))
        //This function check whether all values are equal
    {Maximum_value=0;
        Max_sort_photo_id[5] = {-1,-1,-1,-1,-1,-1}; //array to
        sort the LED indexes
        Max_sort_values[5] = {0,0,0,0,0,0};
        for (i=0; i++; i<6) //Sort the indexes array and the values array
        {for (j=0; j<(5-i) ; j++)
            {if ( P[j] >= Maximum_value ) //P[i] is the intensity
                {Max_sort_values[i] = P[j];
                    Max_sort_photo_Id[i]=i;}
                Maximum_value=0;}
//Max_sort_values will hold an array of the values sorted from max
to min
//max_sort_photo_id will holds sorted indexes from up down
//as an example Max_sort_values[ ]={90,80,75,60, 50, 40} with
Max_sort_photo_id={0,5,1,4 //,2, 3}
// P0 relative intensity reading=90, P5 relative reading intensity=80, P1
relative reading=75
// P4 relative reading=60, P2 relative intensity reading =50, P3 relative
intensity reading=40
// Implementing the Table for Max and 2nd max
if ( ( Max_sort_id[0]==0 ) && ( Max_sort_value[1]==5 ) )
motor1(DOWN, Delta); //case 1 in the Table
if ( ( Max_sort_id[0]==0 ) && ( Max_sort_value[1]==1 ) )
motor2(DOWN, Delta); //2
if ( ( Max_sort_id[0]==1 ) && ( Max_sort_value[1]==0 ) )
motor2(DOWN, Delta); //3
if ( ( Max_sort_id[0]==1 ) && ( Max_sort_value[1]==2 ) )
motor2(DOWN, Delta); //4
if ( ( Max_sort_id[0]==2 ) && ( Max_sort_value[1]==1 ) ) motor1(UP,
Delta); //5
if ( ( Max_sort_id[0]==2 ) && ( Max_sort_value[1]==3 ) ) motor1(UP,
Delta); //6
if ( ( Max_sort_id[0]==3 ) && ( Max_sort_value[1]==2 ) ) motor1(UP,
Delta); //7
if ( ( Max_sort_id[0]==3 ) && ( Max_sort_value[1]==4 ) ) motor2(UP,
Delta); //8
if ( ( Max_sort_id[0]==4 ) && ( Max_sort_value[1]==3 ) ) motor2(UP,
Delta); //9
if ( ( Max_sort_id[0]==4 ) && ( Max_sort_value[1]==5 ) ) motor2(UP,
Delta); //10
if ( ( Max_sort_id[0]==5 ) && ( Max_sort_value[1]==0 ) )
motor1(DOWN, Delta); //11
```

```
if ( ( Max_sort_id[0]==5 ) && ( Max_sort_value[1]==4 ) )
motor1(DOWN, Delta); //12 } //While breaks when bed is
leveled
```

According to an embodiment herein, the sensor device 204 of the 3D printing apparatus 100 preferably adopts a light Emitter and a light Receiver. Both, Emitter as well as Receiver, uses the Infrared spectrum to eliminate ambient light noise. An Infrared LED diode 701 is preferably used as the light Emitter and a plurality of phototransistors 501 are used as light receivers.

For sake of understanding the basic theory of LED Emitter and receiver, few terminologies are explained below:

Angle of incidence is an angle formed between a beam hitting a surface to a normal from the surface.

Angle reflection is an angle formed between a beam reflected from the surface to the normal from the surface.

Radiant Flux is defined as total radiant power emitted by a source expressed in (mW).

Steradian (sr) is a cone of light spreading out from the source which illuminates one square meter of the inner surface of a sphere of 1 m radius around the source.

Radiant Intensity (Ie) is equal to the radiant flux per unit solid angle from a point light source expressed in milliwatts per steradian (mW/sr).

Irradiance (Ee) is a power incident on the given surface at a given distance (mW/cm2).

Reflectivity is an amount of power reflected from the surface divided by the power incident upon it expressed in (%).

Near Infrared (NIR)—The spectrum of infrared radiation in 720-1300 nm range.

Half-angle ($\phi$) is defined as an angle measured with respect to the LED's light emission center line at which the radiant intensity falls to 50% of its max value.

HFE is an amplification parameter defined as Collector current divided by base current in a bipolar transistor. $\beta$ is used to represent this parameter.

Ie (0) is the peak low duty cycle pulsed radiant intensity capability of a source LED (mW/sr).

Ie (ref) is the radiant intensity expressed in (mW/sr) of the power reflected by an object.

Ie, rel is the relative angular intensity in reference to angle $\theta$ of 0 (refers to Emitter).

Sr, rel is the relative angular sensitivity in reference to angle $\theta$ of 0 (refers to Receiver).

Ee (sensor) is the amount of power incident to the sensor expressed in mW/cm 2.

IrLED is a LED that use the Infrared Spectrum as a light source.

Width of coverage is defined as the usable width of illumination at a range measured perpendicular to the zero axis of irradiation.

Figure 12:
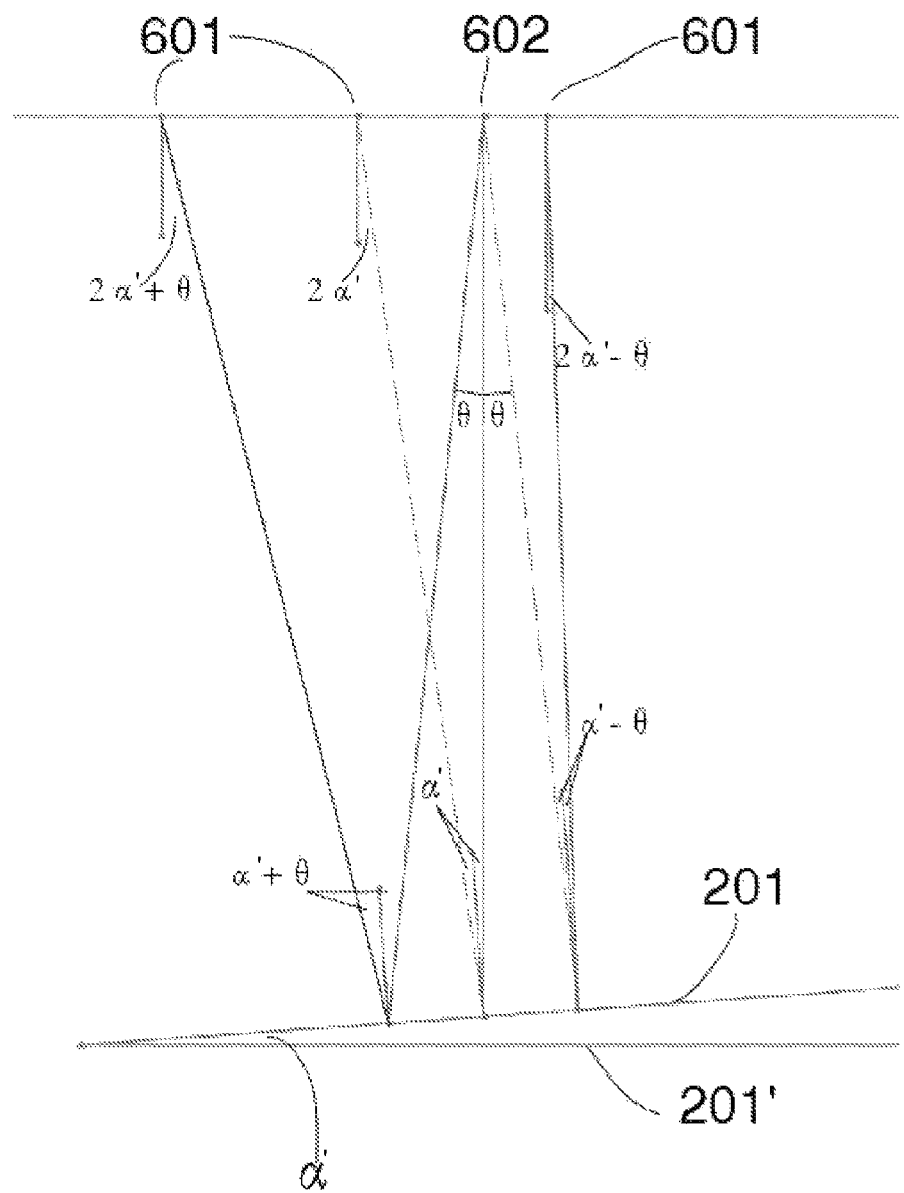
FIG. 12 illustrates a side view of the bed indicating changes of angle of incidence when the bed is tilted by α' in the sensor device in the 3D printing apparatus, according to an embodiment herein.

FIG. 12 illustrates a side view of the bed showing a receiving angle of the plurality of photo detectors, according to an embodiment herein. The Light Emitting Diode (LED) 701 is used for functioning as the emitter in the sensor device 204. The radiant flux is a measurement of the light power emitted by the LED 701. The radiant flux is a power measurement expressed in watts. As shown in FIG. 12, the half-angle ($\phi$) of an IrLED is the angle measured with respect to the LED's light emission center line at which the radiant intensity falls to 50% of its max value. It is an indicator of radiation pattern of the IrLED. The radiant intensity is a measurement the radiant flux per unit solid angle from a point light source 602. The solid angle is expressed in terms of steradian or squared radian.

Figure 13:
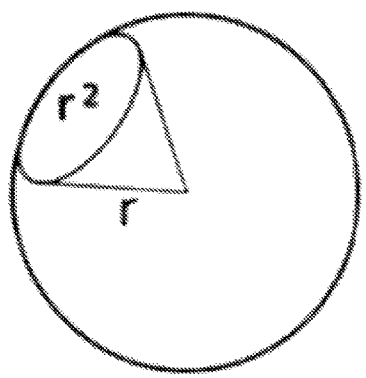
FIG. 13 illustrates a schematic representation of 1 Steradian in a sphere, according to an embodiment herein.

FIG. 13 illustrates a graphical representation of 1 Steradian, according to an embodiment herein. The sphere has radius r, and the area A of the highlighted surface patch is r2. The solid angle $\Omega$ equals A sr/r2 which is 1 sr for this case. The entire sphere has a solid angle of $4\pi$ sr. The LED 701 has a plurality of output intensities that are specified in two type of units: One unit is Radiant Intensity expressed in terms of mW/sr (milliWatts per steradian4) and the other unit is Luminous Intensity which is expressed in photometric units of millicandelas (mcd==millilumens per steradian=mlm/sr) at a typical forward current (e.g. 20 mA) and at the peak of the forward emission radiation pattern.

Figure 14:
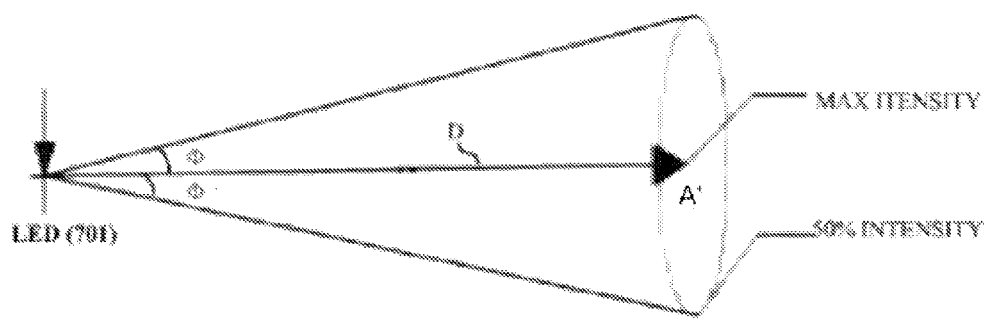
FIG. 14 illustrates a schematic representation of a typical radiation field from a high-radiance LED indicating that the irradiance intensity is maximum at the center and the radiation intensity reduces as gradually moved away from the center, in the 3D printing apparatus, according to an embodiment herein.

FIG. 14 illustrates a schematic representation of a typical radiation field from a high-radiance LED 701 indicating that the radiation intensity is maximum at the center and the radiation intensity reduces as gradually moved away from the center, in the 3D printing apparatus, according to an embodiment herein. As seen in FIG. 14, a center spot A of the radiation field receives greater amount of the irradiance intensity. Thus the maximum irradiance intensity is received at the center whereas the intensity decreases at the field further away from the center.

Figure 15:
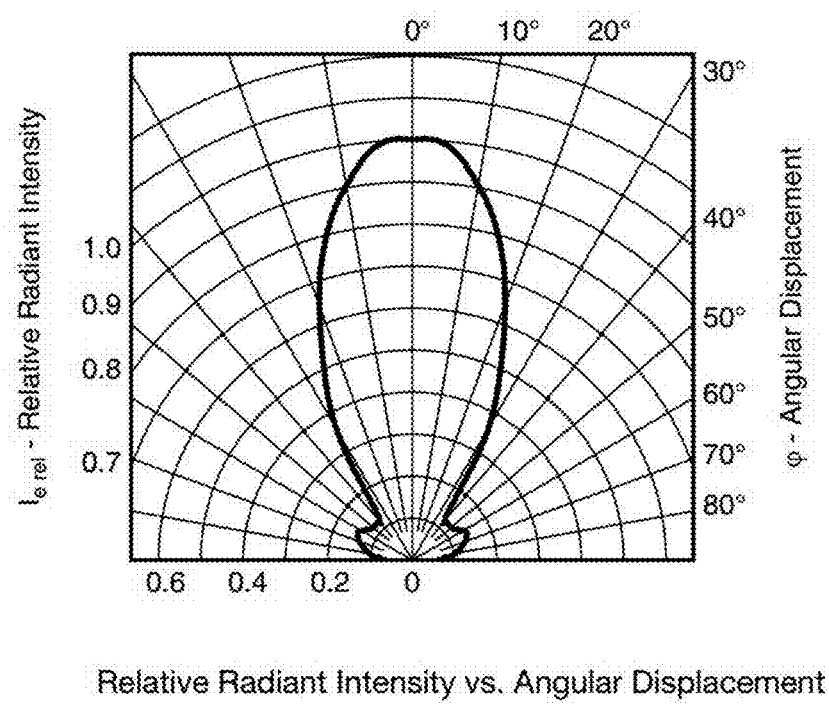
FIG. 15 illustrates a graph indicating a relationship between Relative Intensity and Angular Displacement of a LED, in the 3D printing apparatus, according to an embodiment herein.

FIG. 15 illustrates a graph indicating a relationship between Relative Intensity and Angular Displacement of a LED, in the 3D printing apparatus, according to an embodiment herein. FIG. 15 provides a plot showing how the radiation intensity pattern depends on the direction angle $\theta$. From the FIG. 15, it is clear that a deviation (from 0 degrees) in the angle of radiation causes losses in the intensity of the radiation falling on the surface. To receive a highest intensity at the center of the working surface 201, the surface 201 has to be placed parallel to the LED 701 (perpendicular line from the LED 701 to the surface 201).

Figure 16:
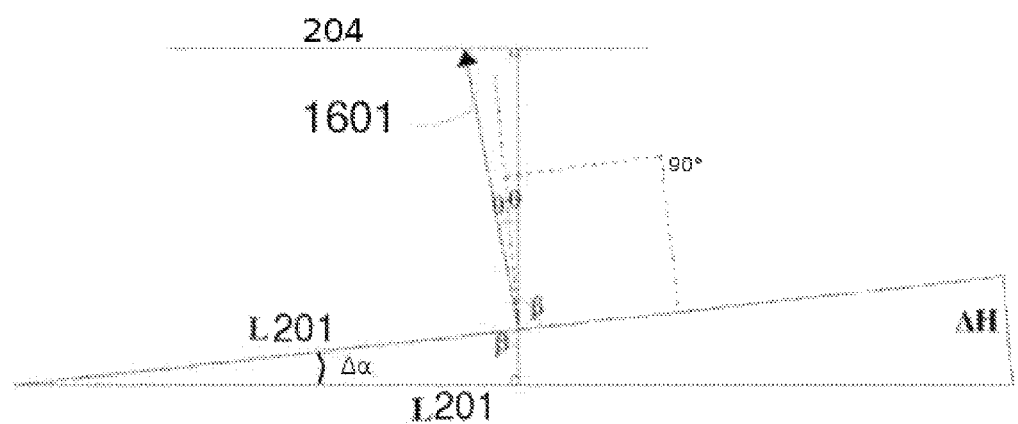
FIG. 16 illustrates a side view of the bed which is displaced by distance AH, in the 3D printing apparatus, according to an embodiment herein.

FIG. 16 illustrates a side view of the bed which is tilted by distance $\Delta H$, according to an embodiment herein. With respect to FIG. 16, when the surface L 201 is tilted by an angle $\Delta\alpha$, the deviation $\Delta\alpha$ causes losses in the intensity of the signal hitting the surface 201. The reflected angle $\theta$ is defined as the angle between the reflected beam 1601 to the normal (perpendicular line to the surface). An angle $\beta$ is the angle between the surface L 201 and the normal. Here the surface L 201 is tilted by the angle $\Delta\alpha$. Where $90=\beta+\theta$ and $\beta=90-\Delta\alpha$ will resolve to $\Delta\alpha=\theta$.

The LED intensity map plotted resembles a circle where the intensity is highest at the center when the working surface 201 is placed parallel to the LED 701. The LED intensity map plotted with the tilted surface 201 will appear as a distorted circle. Therefore, the best layout for phototransistor will have the transistors placed in circular coordinates, where all the phototransistors placed on a circle will have same intensity when the two surfaces are parallel.

The most important attributes for LED emitter 701 are:
Half angle intensity with typical values of 5°, 10°, 15° and 30°.
Radiant Intensity (mw/sr)
Radiant flux (mw) which is total Radiant power
Relative Spectral Sensitivity According to an embodiment herein, the LED emitter 701 works in NIR spectrum range. Furthermore the emitter is chosen to preferably work at a wavelength of 850 nanometer. This ensures that no ambient light will interfere. In addition to the above, the Receiver is also selected for a narrow infrared spectrum.

According to an embodiment herein, the sensor device 204 adopts a phototransistor (PT) 501 as the receiver. The phototransistor 501 is preferably a Bipolar Transistor where the input junction (PN or NP depends of the transistor type) is exposed to incoming light (referring back to FIG. 5A). The incoming light incident on the input junction is generating photo current Ip which is fed into the base of the transistor, amplified as base current and reflected by the Collector current as in a standard Bipolar Transistor. As seen in FIG. 5B, the Common Emitter configuration of the PT 501 produces the output voltage which is a function of the light intensity (Ee) hitting on the exposed junction.

FIG. 17 illustrates a datasheet indicating the basic characteristics of phototransistor in the sensor device in the 3D printing apparatus, according to an embodiment herein. The important parameters that are considered for the phototransistor are listed below:

Half Angle intensity—The angle in which the intensity losses of 50% relative to 0 degree power (maximum). A perpendicular light hitting the phototransistor surface will produce maximum current.

Radial Intensity—Relative Spectral intensity vs. Angular Displacement (Referring to FIG. 17)

Spectral intensity—Relative Spectral Sensitivity vs. Wavelength (Referring to FIG. 17)

Collector Light Current vs. Irradiance—This is similar to the Current collector vs. Current base in standard Bipolar transistor (the β or HFE in a bipolar transistor) (Referring to FIG. 17).

According to an embodiment herein, the working surface 201 is selected such that the surface 201 obeys the Law of Reflection, wherein the angle between the incident ray and the normal to the surface 201 is equal to the angle between the reflected ray and the normal. For example, when the bed 110 is made of glass, there are losses encountered in the reflecting light detected at the receivers. The losses do not lead to loss of information at the receivers as the intensity measurements are relative to each of the receivers and are not analyzed as absolute reading.

According to an embodiment herein, the sensor device 204 comprises at least one LED emitter 701 surrounded by a plurality of phototransistors (PT) 501. The LED emitter 701 is configured to emit a beam of light on to the flat work surface 201. According to the Law of Reflection, the surface 201 is configured to reflect the light back to the sensor device 204. An algorithm is used to analyze the reflected light received by the plurality of phototransistors. The algorithm is configured to store the analog values received at the plurality of phototransistors into an array. The array is a two dimensional structure loaded with analog values for each PT. For example, when an 8 bit ND is used, the values reflecting the light intensity will be from 0 to 255. When the work surface 201 is arranged in parallel to the sensor device 204, all reading received in reference to the origin (Emitter) will be symmetrical. Technically, a phototransistor 501 at co-ordinate (x,y) with a value (Xc, Yc) will show: (Xc,Yc)=(Xc,−Yc)=(−Xc, Yc)=(−Xc,−Yc). Therefore when the phototransistors 501 are placed at radial coordinates, the readings of all the receivers will be equal for any angle. The Light Emitter Diode 701 provides a wider coverage area when compared to a Laser, therefore the beam emitted by the LED 701 is not as directed as the Laser.

Further referring to FIGS. 8A and 8B, the PTs 501 are positioned in the form of two circles. When the test surface and the sensor surface are in parallel, the readings received from the PTs 501 of same circle are equal. When the readings around the circle are not the same, then the two surfaces are not parallel and the highest intensity PT on the circle will indicate that it is closer to the Emitter compared to the lowest intensity PT.

The polar sensor device 204 is facilitated to use only one circle of PTs instead of two circles. But, it is advantageous to use two circles of PTs as they provide a fallback in case the test surface gets broken. The use of two circles further provides more number of readings for the motor(s), so as to fine tune the correction of bed 110 alignment. The polar sensor device 204 allows the use of more number of PTs so as to provide finer resolution while leveling the bed 110.

Figure 18:
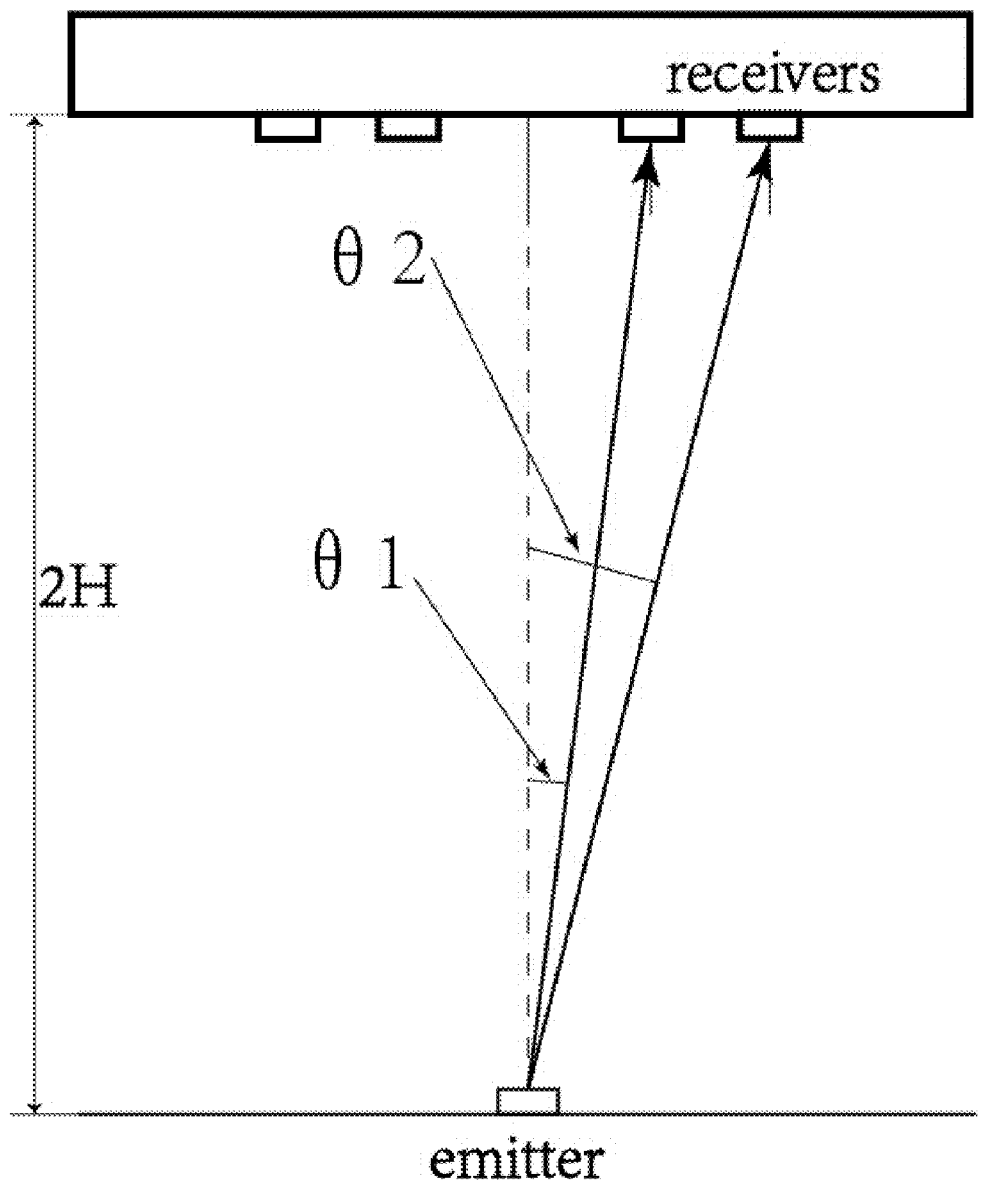
FIG. 18 illustrates a schematic arrangement of a sensor device where the emitter is positioned at a distance of 2H from the sensor device, in the 3D printing apparatus, according to an embodiment herein.

FIG. 18 illustrates a schematic arrangement of a sensor device in which a reflective surface is positioned at a distance of H and the emitter is positioned at a distance of 2H from the sensor board, in the 3D printing apparatus, according to an embodiment herein. The emitter is located at distance 2H from the sensors board. The distance (H) between reflective surface and the sensor board is estimated based on the distance of the Nozzle tip to the Nozzle base. The distance (H) of 5 cm is typically used for most the 3D printer apparatus 100.

According to an embodiment herein, the amount of power incident Ee on the sensor needs to be minimum of 0.1 mW/cm^2 from a distance of 10 cm. Although the receiver detects down to Ee of 0.05 mW/cm^2, the receiver with Ee minimum of 0.2 mW/cm^2 is chosen so as to eliminate noise from other sources. The needed radiant intensity is: $I_e = E_e \times (2H)^2$ $$I_e = 0.1 \text{ mW/cm}^2 \times 10^2 \text{ cm} \times \text{cm}$$

$$I_e = 10 \text{ mW/Sr}$$

FIG. 19A and FIG. 19B illustrate graphs indicating a relationship between relative intensity and angular displacement of the LED emitter and receiver respectively, in the sensor device in the 3D printing apparatus, according to an embodiment herein. The receiver (particularly VEMT2003X01 by VISHAY) detects $E_e$ from 0.01 mW/cm^2 to 10 mW/cm^2. The emitter (particularly VSMF2893RGX01 by VISHAY) emits $E_e$ of 20 mW/Sr when If=100 ma and emits $E_e$ of 180 mW/sr when pulsed (If=1 A @ 1 microsecond). Therefore the pulsing of the emitter, leads to a power incidence of up to 180 mW/cm^2. The composition of the VSMF2893RGX01 emitter and VEMT2003X01 receiver is shown in table given below: (Refer FIGS. 19A and 19B).

TABLE 2

| Degrees | VSMF2893RGX01 I, rel | VEMT2003X01 S, rel | Product |
| --- | --- | --- | --- |
| 0° | 1 | 1 | 1 |
| 5° | 0.99 | 0.99 | 0.98 |
| 10° | 0.9 | 0.97 | 0.873 |
| 15° | 0.8 | 0.91 | 0.728 |
| 20° | 0.75 | 0.83 | 0.62 |
| 25° | 0.5 | 0.75 | 0.375 |
| 30° | 0.35 | 0.61 | 0.21 |

Further the angles θ1 and θ2 are selected such that θ1=20° and θ2=25° as they reflect highest sensitivity. A small change in the angle reflects larger change in intensity.

The distance X1 is calculated as:

$$X1 = 2H^* \tan(\theta_1) \rightarrow X1 = 10^* \tan(20)$$

$$X1 = 3.64 \text{ cm}$$

The distance X2 is calculated as:

$$X2 = 2H * \tan(\theta_2) \rightarrow X2 = 10 * \tan(25)$$

$$X2 = 4.66 \text{ cm}$$

Another way of calculating distance is by expressing the radiant intensity Ie by: $Ee * D^2$, where D is unknown. Assuming that the bed 110 is moved vertically by distance X, an irradiance reading from PT is estimated and marked as Ee1. The bed 110 is further moved by X and another irradiance reading is taken from the PT which is marked as Ee2. $Ee1 * D^2 = Ee2 * (D+X)^2$. In both the above cases, the LED is operated in the same manner and the radiant intensity is also not changed. Thus the equation becomes as follows: $(Ee2-Ee1)D^2 + 2 * Ee2 * D * X + Ee2 * X^2 = 0$.

Figure 20:
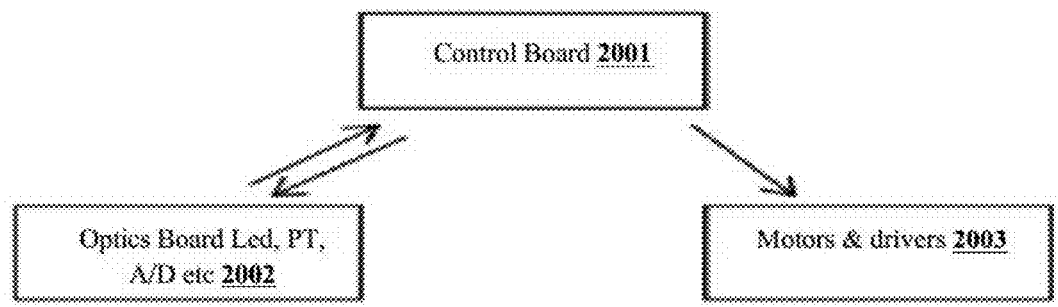
FIG. 20 illustrates a block circuit diagram of a control system in the 3D printing apparatus, according to an embodiment herein.

FIG. 20 illustrates a block diagram of the printing apparatus 100 for depicting communications occurring between various components of the printing apparatus 100, according to an embodiment of the present disclosure. The control board 2001 (as shown in FIG. 20) is a electronic board with the Central Processing Unit (CPU) configured to control and read data from the Optics board 2002. The Control Board 2001 also transmits the steps of rotation for the motors driver board 2003. The control board 2001 is connected to the Optics board 2002 using the following signals: chip select 0 CS0 for the board, received data signal (RxD) as per serial peripheral interface (SPI) standard protocol, transmit data signal (TxD) as per serial peripheral interface (SPI) standard protocol, clock (CLK) for the SPI standard protocol, pulse width modulation (PWM) for firing the Led, common ground GND for all boards and power supply +3.3 VDC for the control board 2001, optics boards 2002 and 2003. The Control Board 2001 operates the LED 2002 by inserting a PWM signal for 80 microseconds. The control board 2001 also reads the outputs from the plurality of PTs 2002 via SPI (Serial Protocol Interface) from the analog to digital converter ADC088S102 by TEXAS INSTRUMENTS. A ribbon connector is used to connect the Control Board 2001 to the Optics Board 2002. The control board 2001 controls the motors and motor drivers board by using the following signals: direction command1 (DIR1) to step motor, direction command2 (DIR2) to step motor, step command 1 (STEP1) for motor, step command 2 (STEP2) for motor, fault signal 1 (NFAULT1) from motor, fault signal 2 (NFAULT2) from motor, supply voltage +3.3 VDC.

Figure 21:
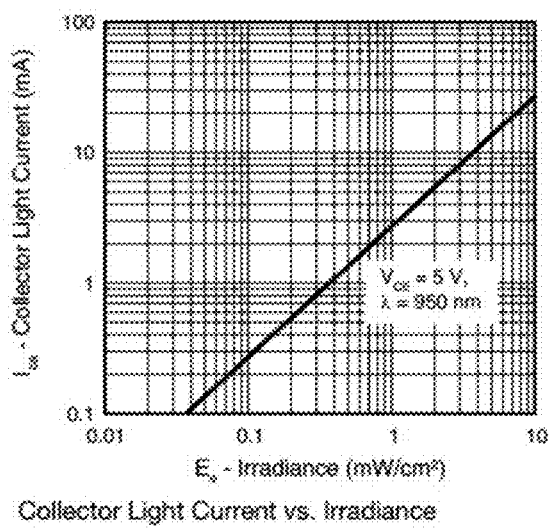
FIG. 21 illustrates a graph indicating a relationship between the collector light current and Irradiance for the phototransistor receiver, in the sensor device for 3D printing apparatus, according to an embodiment herein.

FIG. 21 illustrates a graph indicating a relationship between the collector light current and Irradiance for the LED receiver, in the sensor device for 3D printing apparatus, according to an embodiment herein. The FIG. 21 shows receiver current selection for irradiance (Ee) of 0.1 mW/cm^2. With respect of FIG. 21, the ¼ of power supply (VCC) is selected to reflect Ee of 0.1 mW/cm^2, for receivers in a circuit with power supply VCC of 3.3 volts.

When an irradiance Ee of 0.1 mW/cm^2 is applied onto the transistor, the resistance Re is selected such that the phototransistor is configured to operate in a working area (not saturated and not cut off). The minimum receiver sensitivity is selected as 0.05 mW/cm^2 (Ic~0.15 mA) range for Vo=⅛ Vcc. The collector current is as 0.15 mA (derived from FIG. 21). With the emitter current Ie approximately equal to the collector current Ic, the resistance Re is calculated as follows. With respect of FIG. 21, when $(Ie \sim Ic) \rightarrow Re = \frac{1}{8} * 3.3/0.15 \rightarrow Re = 2.75$ K.

From the above calculation, the standard resistor of 2.7 KΩ is selected. With the receiver configuration using the above calculated parameters, the maximum voltage that is detected in Vo is approximately 2.9V which reflects an irradiance of ~0.4 mW/cm^2. The output voltage Vo from each receiver is fed into an A/D converter.

The emitter diode needs to be driven by Ie of 10 mW/Sr to produce the required Radiant intensity. The VSMF2893RGX01 emitter is configured to deliver 40 Ie of mW/Sr with direct current and 180 mW/Sr when pulsing current is used. A single pulse is typically used to emit the maximum Ie of 180 mW/Sr.

Figure 22:
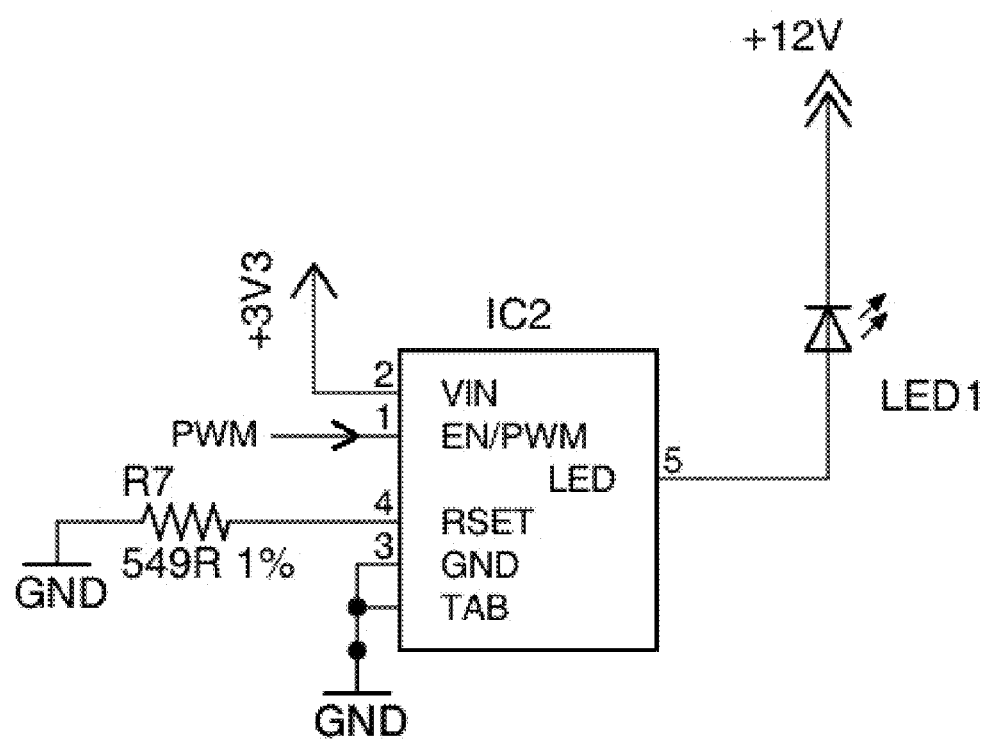
FIG. 22 illustrates a circuit diagram of current drive circuit for the Emitter, in the sensor device for 3D printing apparatus, according to an embodiment herein.

FIG. 22 illustrates a block circuit diagram of drive circuit for Emitter, in the sensor device for 3D printing apparatus, according to an embodiment herein. A constant-current sink (particularly CAT4101 by ON SEMICONDUCTOR) is used to drive the emitter VSMF2893RGX01. FIG. 22 illustrates a circuit diagram of CAT4101 which is used to drive the Emitter, according to an embodiment herein. The resistor RSET is set to 549Ω (1 A). The PWM (Pulse Width Modulation) is set to a maximum of 80 microseconds. The limitation tends to reduce the maximum radiant intensity, but assures to protect the LED. The number of emitter LED operating per second is reduced so as to further reduce the load on the power supply. The number of the LEDs emitting per second is also limited.

Typically, an Analog to Digital converter (ADC) of 8-bit is selected to simplify the processing of 8-bit data size. Preferably ADC088s102 by TEXAS INSTRUMENTS is chosen. The ADC device has at least 8 channels and uses a Serial Protocol Interface (SPI) for transferring and receiving data.

According to an embodiment of herein, the 3D printing apparatus 100 adopts a procedure which is followed by the motors for levelling the bed 110. Few conditions need to be followed while levelling the bed 110. Firstly, only one motor is operated at a time. The bed 110 is first moved by a pre-defined amount of displacement. The effect of displacement is checked by injecting a correction to the apparatus 100. When, the bed 110 gets closer to levelling (when the correction tilts the bed 110 to the opposite direction), the injected correction is refined to half of the previous value.

The following procedure is performed on each of the motors. The bed 110 will be leveled by detecting error in orientation of the bed 110; by taking a corrective step to align the bed 110 using the motor and repeating the previous steps until the bed 110 is leveled.

A function d1( ) is returning the reading from the sensors reflecting the highest intensity LED location. This is marked as d1( ). The function d1( ) has the following return values:

Left—indicating that the highest intense LED is on a left plane intensity;

Right—indicating that the highest intense LED is on a right plane intensity; and 0—No LED is intense Indicating that the bed 110 is leveled.

The direction variable is configured to keep the motor moving is the present direction.

1. Set motor steps to DH=0.5 mm.
2. if d1( )=0 then {this motor is leveled Done;}
3. if (d1( )=Right) then direction=UP else direction=Down
4. if (d1( )=0) then this motor is leveled
5. if (d1( )=Right) AND direction=UP) then
5.1. move motor Up by DH
5.1. Goto 4
6. if (d1( )=Right) AND direction=DOWN) then
6.1. DH=DH/2
6.2. move up motor by DH
6.3. direction=UP
6.3. Goto 4
7. if (d1( )=Left) AND direction=DOWN) then 7.1 move down motor by DH
7.1. Goto 4
8. if (d1( )=Left) AND direction=UP) then
8.1. DH=DH/2
8.2. move down motor by DH
8.2. direction=DOWN According to an embodiment here, the distance between the bed 110 and the sensor board 204 is calculated after the bed 110 is leveled.

Figure 23:
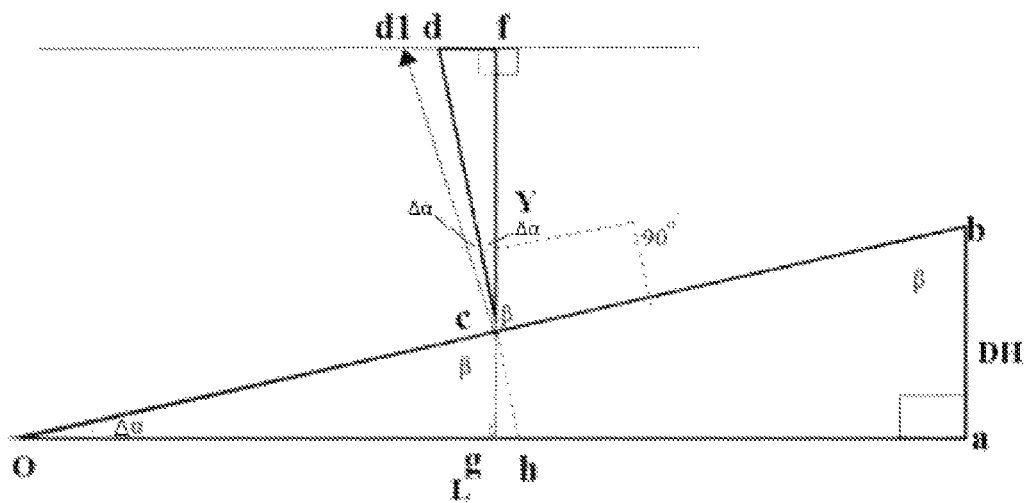
FIG. 23 illustrates a side view of bed surface when moved by a distance of DH, in the sensor device for 3D printing apparatus, according to an embodiment herein.

FIG. 23 illustrates a side view of bed 110 when moved by DH, according to an embodiment herein. Since the distance to the bed 110 (fg) is unknown, the motor moved by DH is used to measure the distance (fg) from the sensors to the bed 110 (Referring to FIG. 23). The triangles oab, cfd and ogc are similar, therefore:

$$\tan(\Delta\alpha) = DH/L \quad (1)$$

L is the distance between the Motor to the fake Motor. DH is the distance the step motor traveled and hence it is a known value.

$$\tan(2\Delta\alpha) = (d1f)/fc \quad (2)$$

Tangent double angle identity is: (3) tan (2α)=2*tan(α)/(1−tan^2(α))

$$d1f/fc = 2*(DH/L)/(1-(DH/L)^2) \quad (3)$$

d1f is known from the sensors reading.

Figure 24:
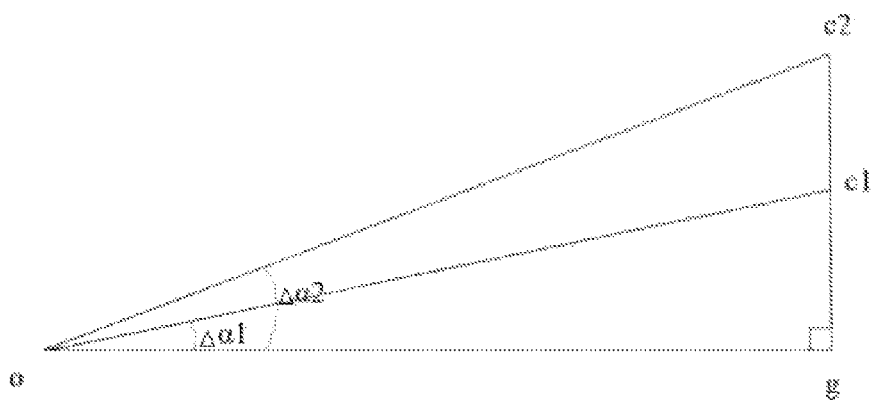
FIG. 24 illustrates a triangle ogc2 representing a portion of side view of the bed, in the 3D printing apparatus, according to an embodiment herein.

FIG. 24 illustrates the triangle ogc2 representing a portion of the side view of the bed 110, according to an embodiment herein. With respect to FIG. 24, the angle c1og is Δα1 which equals to arctan(DH/L), angle c2og is Δα2 which equals to artan(2DH/L), and c1c2=c2g−c1g=fc1−fc2 is also known. So $$\tan(\Delta\alpha2) = (c1c2+c1g)/og \quad (6)$$

$$\tan(\Delta\alpha1) = c1g/og \quad (7)$$

Divide function (6) by function (7) we have $$\tan(\Delta\alpha2)/\tan(\Delta\alpha1) = (c1c2+c1g)/c1g \quad (8)$$

$$c1g = c1c2/(\tan(\Delta\alpha2)-1) = c1c2/((2DH/L)/(DH/L)-1)$$
$$= c1c2 = fc1-fc2. \quad (9)$$

Figure 25:
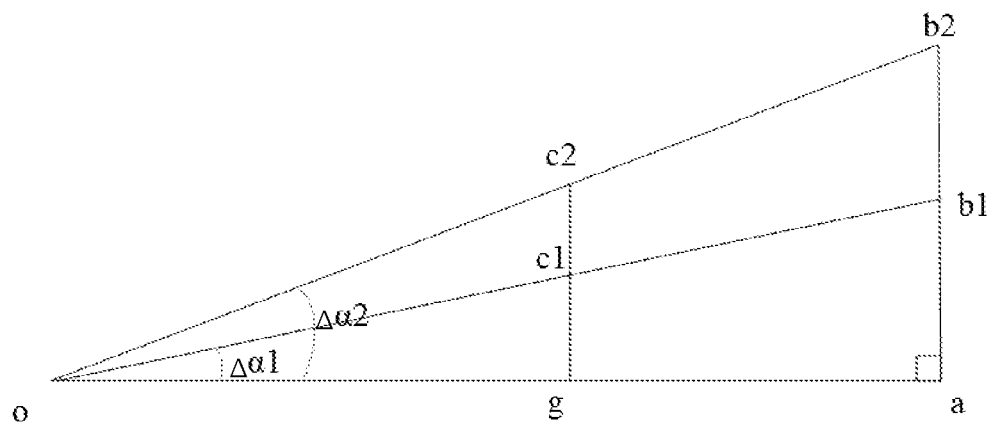
FIG. 25 illustrates a triangle oab2 representing a portion of the side view of the bed, in the 3D printing apparatus, according to an embodiment herein.

FIG. 25 illustrates the triangle (triangle oab2) representing a portion of the bed, according to an embodiment herein. The result remains same by: (with reference to FIG. 25)

$$b1a/oa = c1g/og \quad (10)$$

$$b2a/oa = c2g/og \quad (11)$$

Divide the above two functions to get $$2c1g = c2g. \quad (12)$$

$$c1g = c1c2 = fc1-fc2. \quad (13)$$

The distance (D) between the sensor surface and the bed 110 to be $$fc1+c1g = 2fc1-fc2 \quad (14)$$

$$D = 2fc1-fc2$$

Where fc1 and fc2 are known values as shown earlier Calibration:

Since all the LED receivers (phototransistor) are not equal and all surfaces do not reflect the same and all phototransistors are made equal. Therefore, there is a need to calibrate the apparatus to compensate for any deviation in the specification. The calibration is to bring into account all variations and to calculate the results due to the use of an ideal LED transmitter and phototransistor. The calibration is performed using software and is configured to set correction multiplier for each read of any phototransistor and/or emitting parameter value for the emitting LED for each of the photodetectors. In addition, the calibration also normalizes the reading to be used with a microprocessor and A/D.

Figure 26:
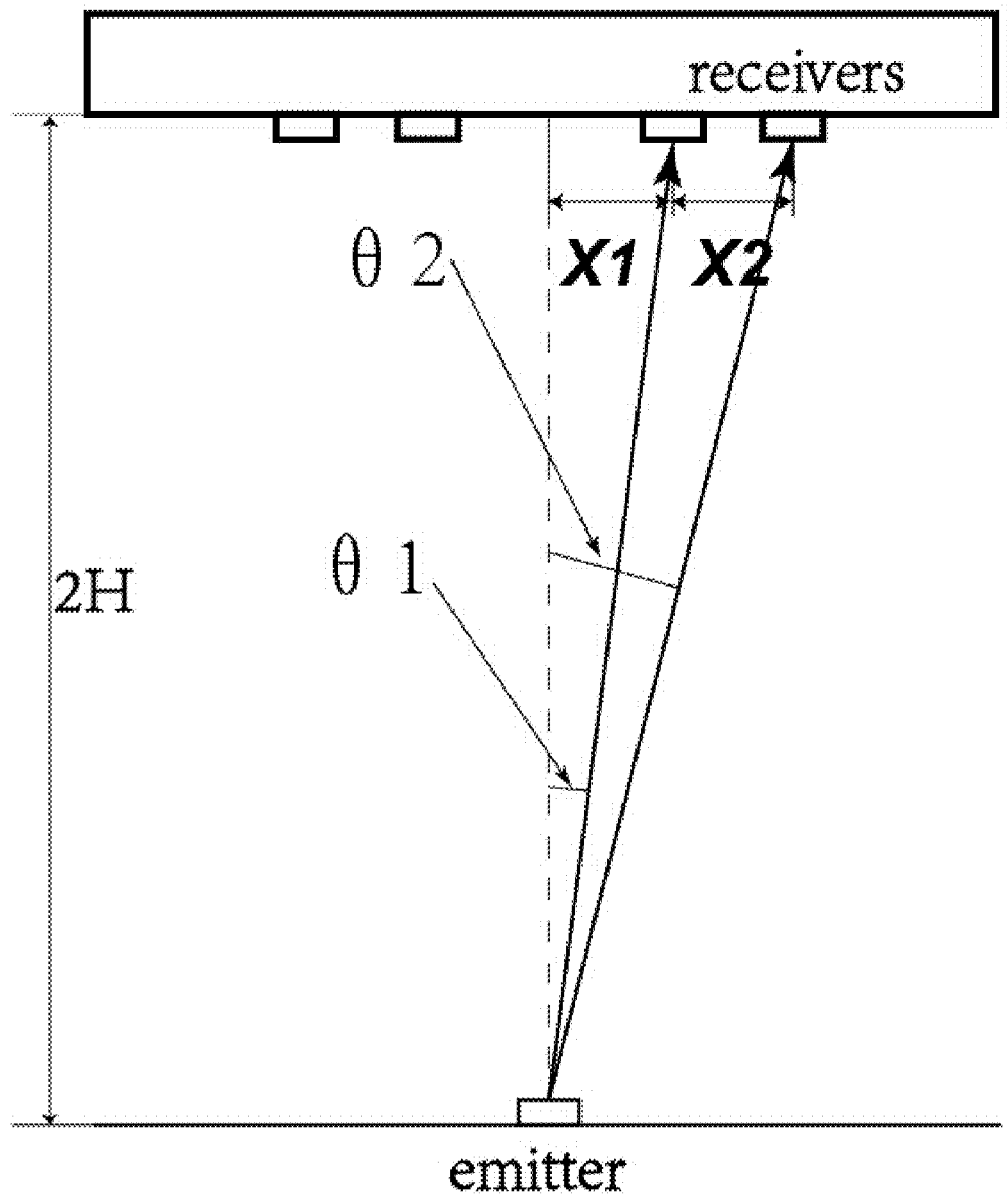
FIG. 26 illustrates a side view of sensors at a 2H distance to the emitter, in the 3D printing apparatus, according to an embodiment herein.

FIG. 26 illustrates a side view of sensor and bed 110 with the distance unfolded to 2H, according to an embodiment herein. The emitter beam reflects back in a circular area equivalent to a circular area that will be created in a distance 2*H from the emitter. Hence, a model is used for calculations where the Emitter is 2*H away from the phototransistors surface as shown: (Referring to FIG. 26).

For example, H is selected to be 5 cm. The values of X2 and X1 are calculated to reflect 25° and 20° for θ2 and θ1 respectfully. The calibration is performed at the factory or at the field. To perform the calibration, a leveled surfaced is presented in front of the sensor board 204. This is achieved by putting a hanging cage on top of the sensor board 204 that ensures/enforces the sensor board 204 to be parallel to the calibration surface. The time calculated for each phototransistor to reach the value of 200 after the IrLED is fired/activated. A value of 200 for the inner circle PT is chosen so as to make sure that the PT under test senses ~0.4 mW/cm^2 following a time decay.

```
For internal circle:
for (j=0; j<50; j++ )
{for (i=0; i<3; i++)
    {fire_LED(80 microseconds);
        startTimer( );
        while (testValue > 200)
        {testValue = readPT(i);}
        Value = stopTimer( );
        timer_values[i][j] = Value;
        wait (0.1 seconds);}}
For the external circle:
for (j=0; j<50; j++ )
{for (i=0; i<3; i++)
    {fire_LED(80 microseconds);
        startTimer( );
        while (testValue > 150)
        {testValue = readPT(i);}
        Value = stopTimer( );
        timer_values[i][j] = Value;
        wait (0.1 seconds);}}
```

The variable timer value for each phototransistor assures that a timer value of 200 is read from the photodiode, if the IrLED emits 80 microseconds pulse with 1 A. The value 200 is reflective of 3.3*200/255 voltage reading: 2.6V→Ic=2.6/2.7.

Ic=0.96 ma which reflects ~0.4 mW/cm^2

Clearly, when the calibration surface is gone, the reading values are other than 200. If the test surface is further away, then the readings are smaller values. However, if the test surface is parallel, the readings are of same values around the circle.

For example the Collector light current parameter deviates up to ±50% for part as shown in table 3 below.

TABLE 3

| Parameter | Min | IC (mA) Typical value | Max |
|---|---|---|---|
| Collector light current @ Ee = 1 mW/cm2, = 950 nm, VCE = 5 V | 3 | 6 | 9 |

The Calibration is done by placing a test surface in parallel to the sensor board 204 and in a known distance H.

Figure 27:
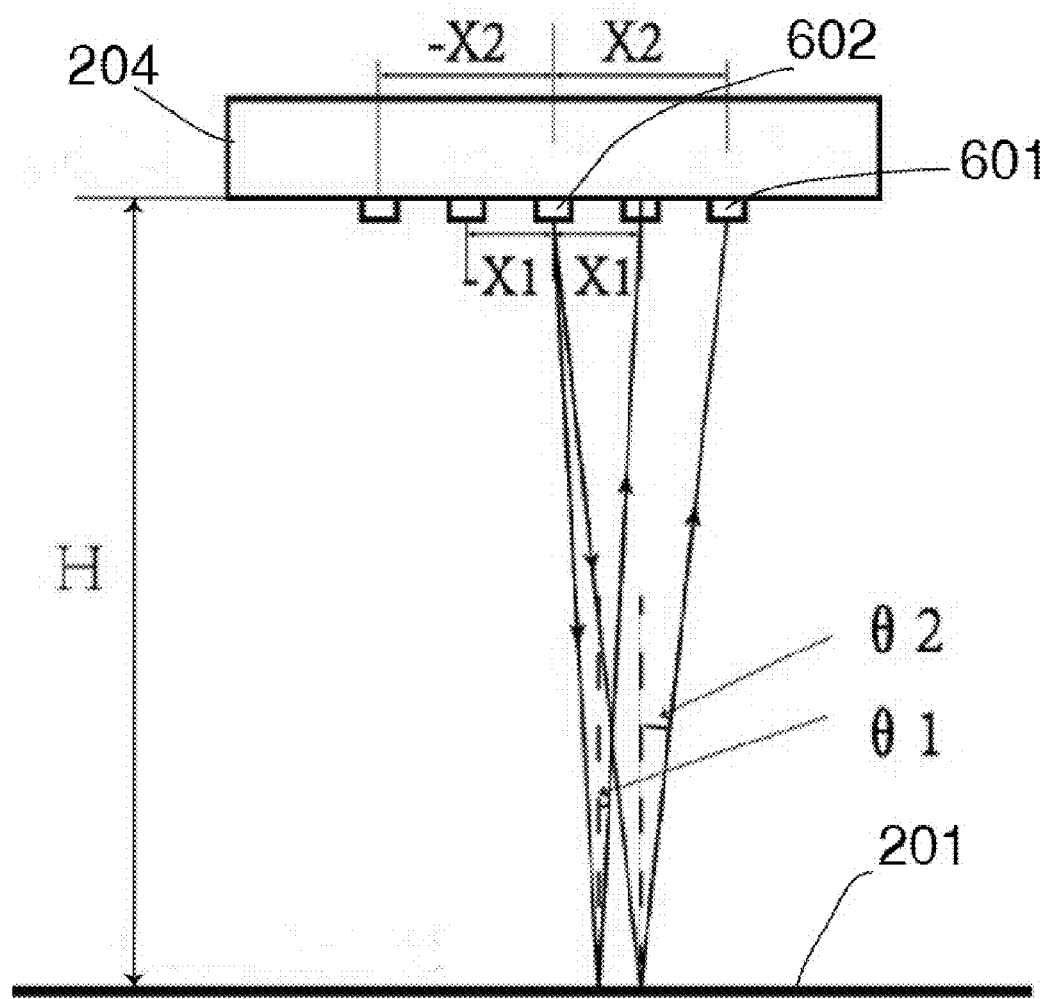
FIG. 27 illustrates a side view of sensors and emitter with the distance H to the bed, in the 3D printing apparatus, according to an embodiment herein.

FIG. 27 illustrates a side view of sensor and bed 110 with the distance unfolded to H, according to an embodiment herein. The emitter beam is reflected back in a circular area equivalent to a circular area that is created in a distance 2*H from the emitter. Hence, a model is used for calculations where the Emitter is 2*H away from the phototransistors surface as shown in FIG. 27.

Figure 28:
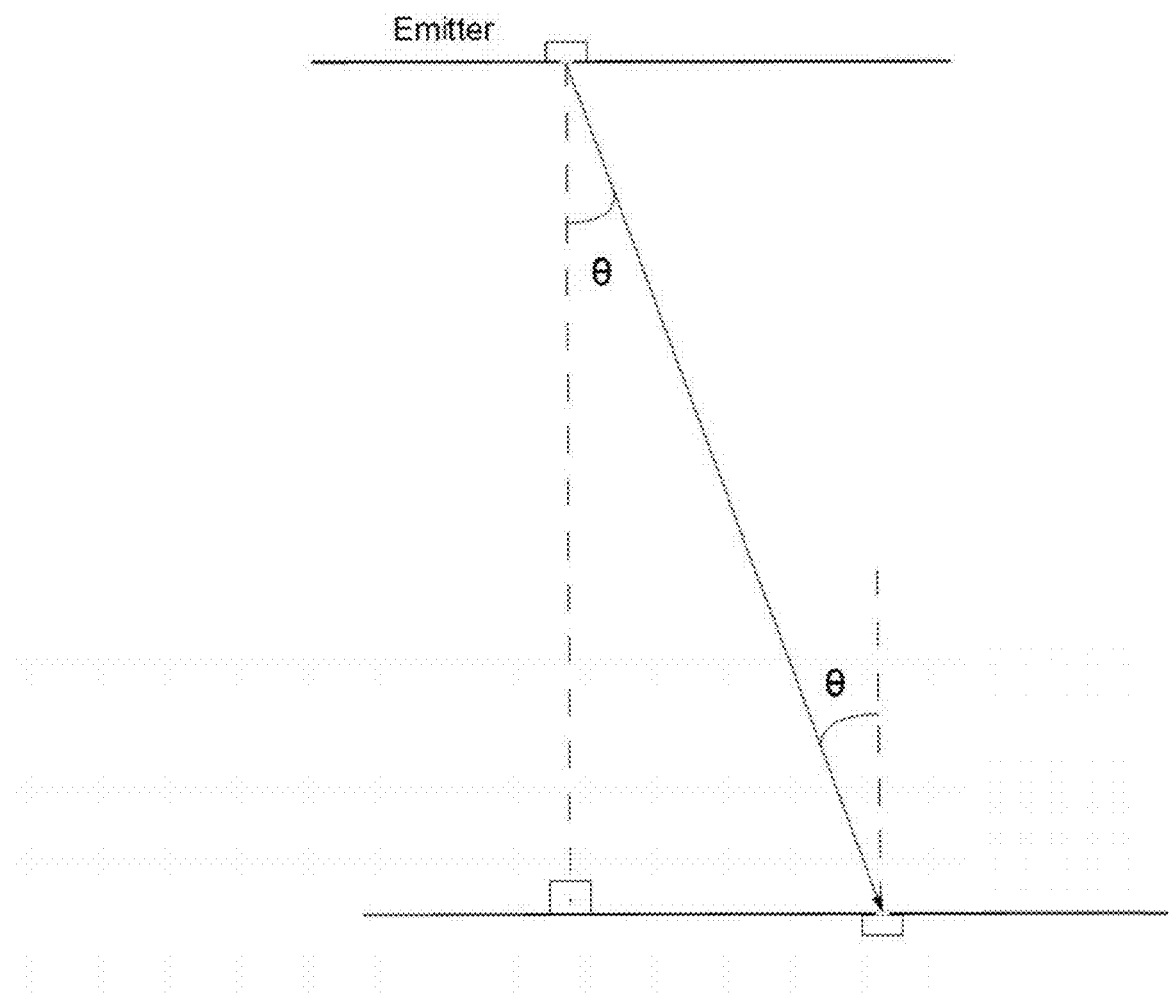
FIG. 28 illustrates a side view of sensor and bed indicating an angle of incident, in the 3D printing apparatus, according to an embodiment herein.

FIG. 28 illustrates a side view of sensor and bed for representing angle of incident, according to an embodiment herein. The PT has an intensity of:

$$E_e(PT1)=E(0)*f(\theta 1) \text{ and } E_e(PT2)=f(\theta 2)$$

where $E_e$ (PT1) is the Irradiance ($E_e$) when the phototransistor is sensing. (see FIG. 28 for reference).

The intensity on the PT surface is expressed in symmetrical receiver and emitter as follows:

$$E_e(\theta)=E_e(0)*Cosine(\theta)*Cosine(\theta)$$

In the above mentioned case, the intensity is given as:

$$E_e(\theta)=E_e(0)*I_{e,rel}(\theta)*S_{e,rel}(\theta)$$

The table below provides the composition of the emitter and receiver.

TABLE 4

| Degrees | VSMF2893RGX01<br>I, rel | VEMT2003X01<br>S, rel | Product |
|---|---|---|---|
| 0 | 1 | 1 | 1 |
| 5 | 0.99 | 0.99 | 0.98 |
| 10 | 0.9 | 0.97 | 0.873 |
| 15 | 0.8 | 0.91 | 0.728 |
| 20 | 0.75 | 0.83 | 0.62 |
| 25 | 0.5 | 0.75 | 0.375 |
| 30 | 0.35 | 0.61 | 0.21 |

Further a threshold angle $\theta 3$ is defined and selected the angle in which ~65% of the maximum power sent by the Emitter is lost. The reason for the definition is to bring into account the losses of the irLed and the losses of the PT in respect to $\theta$:

According to an embodiment herein, the selection of distance H is performed in the following manner: The emitter needs to eject the light beam with enough power to reach the receiver:

$$E_e=I_e/H^2// \text{ when the H is at least 5 time larger than the power source}$$

A minimum of Ee=0.5 mW/cm^2 is chosen to eliminate an ambient light noise. A test value of 10 cm is chosen for H as this is the desired distance to the bed 110.

$$I_e>Ee*H^2$$

$$I_e>0.5*100$$

$$I_e>50 \text{ mW/Sr}$$

The VSMF2893RGX01 is configured to deliver 50 mW/Sr with a current of ~110 ma @ 1 with microsecond pulse. For sake of efficient calculation, the VEMT2003X01 receiver is made used in the range of 0.5 mW/cm^2 to 2 mW/cm^2.

For calculation of X1 and X2, an angle of 20° is chosen from the composition table provided above and calculate X1:

$$\tan(\theta 1)=X1/2H$$

$$X1=\tan(20°)*20$$

$$X1=3.64 \text{ cm}$$

To calculate X2, the angle of 25° is chosen $$\tan(\theta 2)=X2/2H \rightarrow X2=\tan(15)*20$$

$$X2=4.66 \text{ cm}$$

Figure 29:
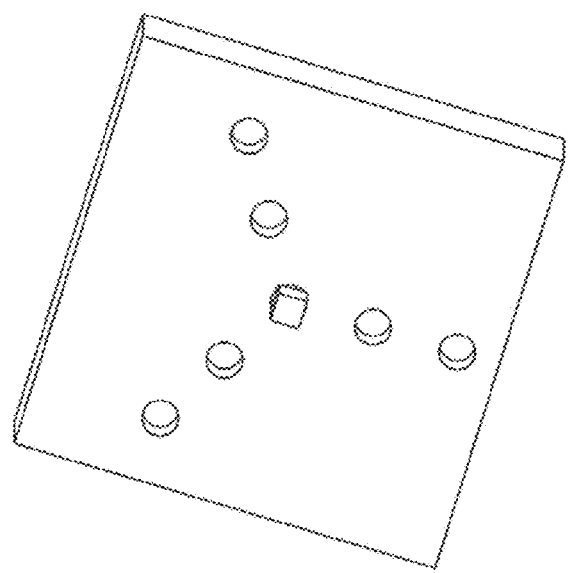
FIG. 29 illustrates a perspective view of a polar sensor board, for the sensor device in the 3D printing apparatus, according to an embodiment herein.
Figure 30:
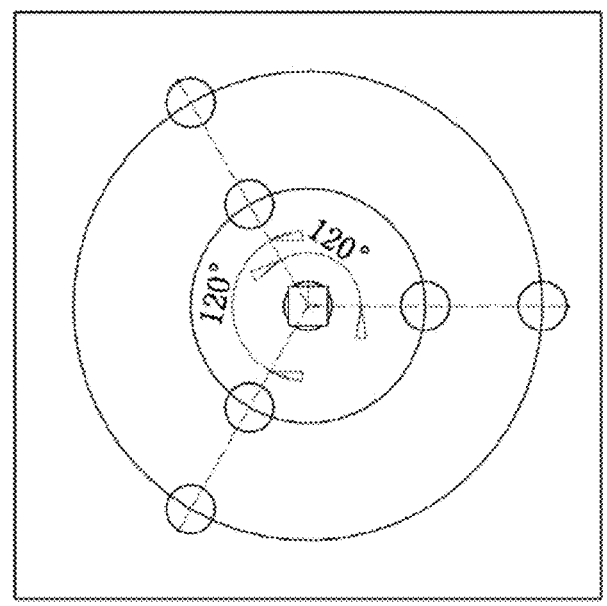
FIG. 30 illustrates a bottom view of the polar sensor board for the sensor device in the 3D printing apparatus, according to an embodiment herein.

Initially, the sensor board 204 used 6 sensors in each circle and 2 circles in a total as shown in FIG. 8A and FIG. 8B. As long as the corresponding sensors detect same reading, the bed 110 is assumed to be in level. Since some of the sensors are redundant, all the sensors are not needed. As long as the readings are the same, the number of sets of data received from the sensors, does not make any sense. Hence the sensor board 204 is simplified to use just three sensors on each circle. The modified sensor is shown in FIG. 29 and FIG. 30. FIG. 29 illustrates a perspective view of the modified sensor, according to an embodiment herein. FIG. 30 illustrates a bottom view of the modified sensor, according to an embodiment herein.

According to an embodiment herein, the main functionality of the motor is to convert the rotational motion into the vertical movement of the bed 110 using the screws. The Fine Adjustment screws with TPI 80 are selected to deliver 318 micrometer vertical movement per revolution. The stepper motor driver is capable to deliver steps as small as 1.8° of a complete turn. The vertical resolution is: 1.8/360*635→1.59 micrometer. To move the motor up by 1 mm the number of steps required is =1000/1.59→629 steps. Finner resolution is achieved using higher threads per inch as shown in Table 5.

TABLE 5

| TPI (Threads per Inch) | Pitch (mm/revolution) | Pitch (μm/revolution) |
|---|---|---|
| 40 | 0.635 | 635 |
| 80 | 0.318 | 318 |
| 100 | 0.254 | 254 |
| 127 | 0.2 | 200 |
| 200 | 0.127 | 127 |
| 254 | 0.1 | 100 |

Figure 31:
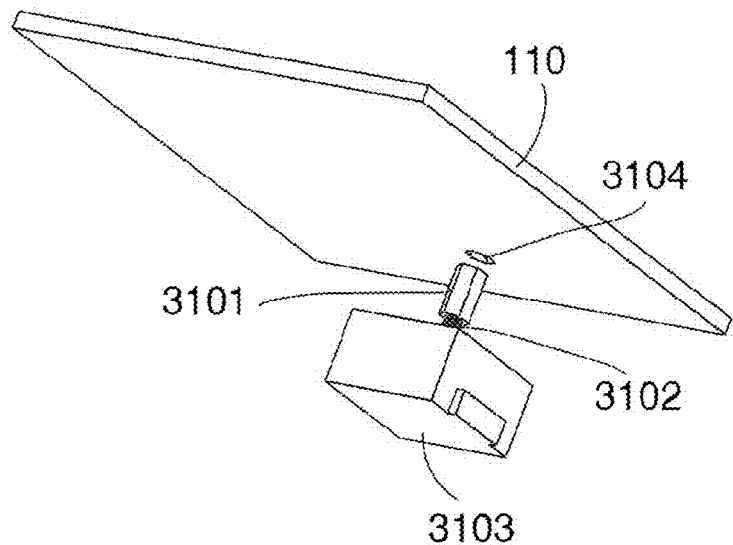
FIG. 31 illustrates a side view of the motor and a screw under the bed, in the 3D printing apparatus according to an embodiment herein.
Figure 32:
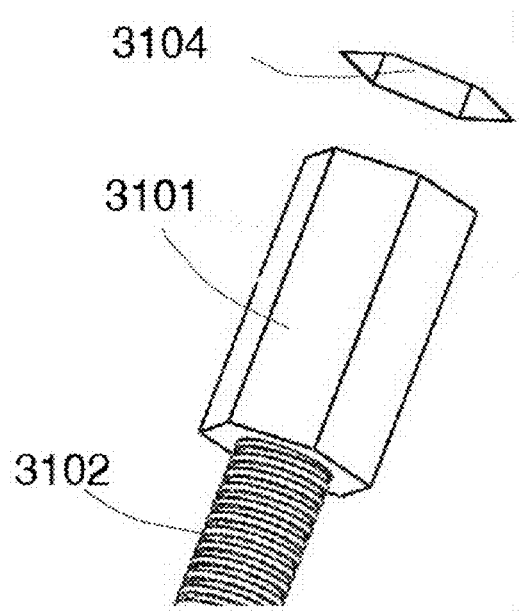
FIG. 32 illustrates an enlarged side perspective view of the screw and the coupling nut, in the 3D printing apparatus according to an embodiment herein.
Figure 33:
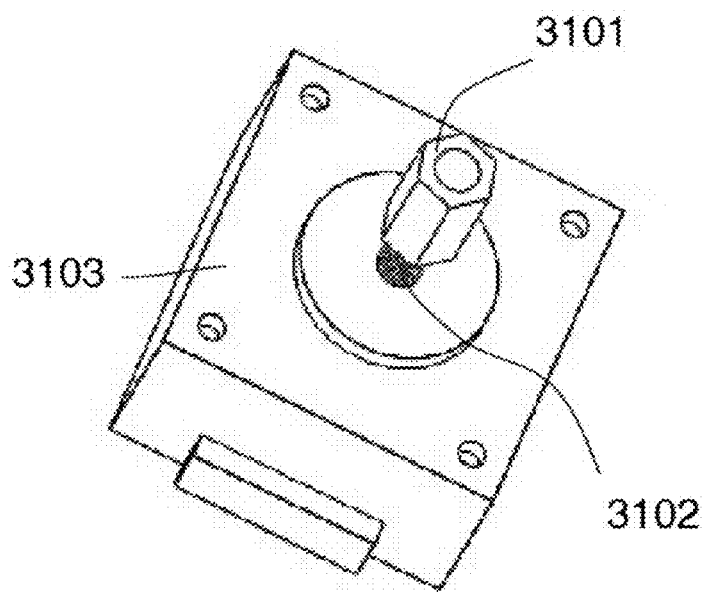
FIG. 33 illustrates a top side perspective view of the motor with the coupling nut, in the 3D printing apparatus according to an embodiment herein.
Figure 34:
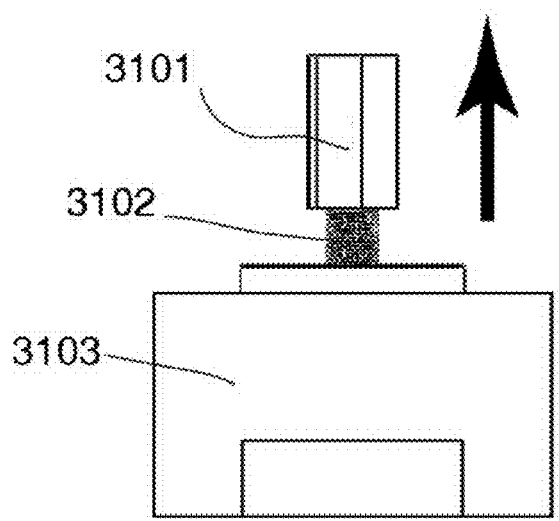
FIG. 34 illustrates a side view of the motor with the coupling nut in the 3D printing apparatus, according to an embodiment herein.

FIG. 31 illustrates a side view of the motor and a screw under the bed 110, according to an embodiment herein. FIG. 31 shows the way in which the coupling nut 3101 fits into the hex shape hole 3104 in the bed 110. FIG. 32 illustrates an enlarged view of the screw 3102 and hole 3104 from under the bed 110, according to an embodiment herein. FIG. 33 illustrates a top view of the motor 3103 with the coupling nut 3102, according to an embodiment herein. FIG. 34 illustrates a side view of the motor 3103 with the nut 3102 indicating a screw location, according to an embodiment herein. With respect to FIGS. 31, 32, 33 and 34, the motor rotations are transferred to the screw 3102 of the motor 3103 which creates torque between the coupling nut 3101 and the screw 3102. The screw 3102 is configured to drive into the hex thread in the bed 110, thus, driving the bed 110 in the vertical direction.

Figure 35:
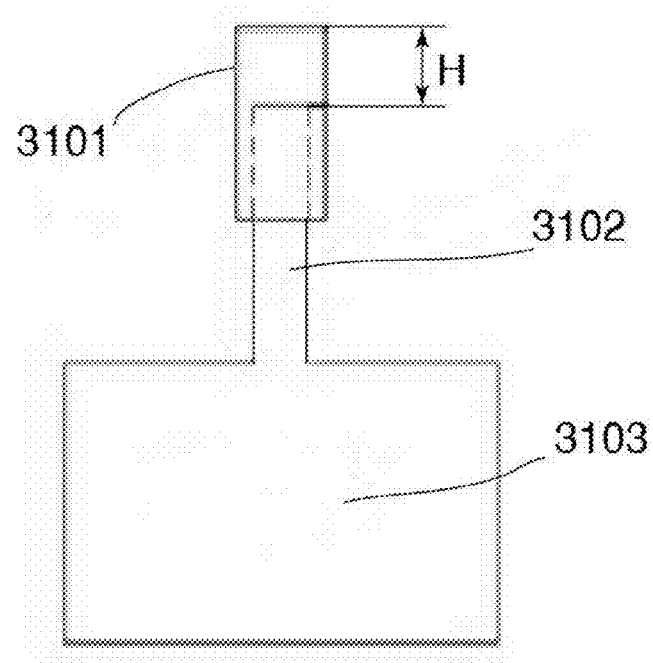
FIG. 35 illustrates a side view of the motor with the coupling nut indicating screw location, in the 3D printing apparatus, according to an embodiment herein.

FIG. 35 illustrates a side view of the motor with the nut, according to an embodiment herein. The M3 screw 3102 for the motor is selected, with height of 20 mm. The coupling nut 3101 is M3 with width of 8 mm and height of 15 mm. When coupled together, the starting position is set to be H=3 mm, so the coupling nut 3101 of 3 mm is configured to move up or down, thereby pushing the bed 110 up or down for 3 mm. This movement is enough to level the bed 110 for the two extreme positions. The First extreme position is attained by moving down the bed 110 by 3 mm (H=0) and the coupling nut 3101 is leveled with the top of the screw 3102. The Second extreme position is obtained by moving the bed 110 to a position H=6 mm. The coupling nut 3101 is 15 mm long. Hence the coupling of 9 mm is still left to hold the coupling nut 3101 and screw 3102 together, thereby keeping it stable.

Figure 36:
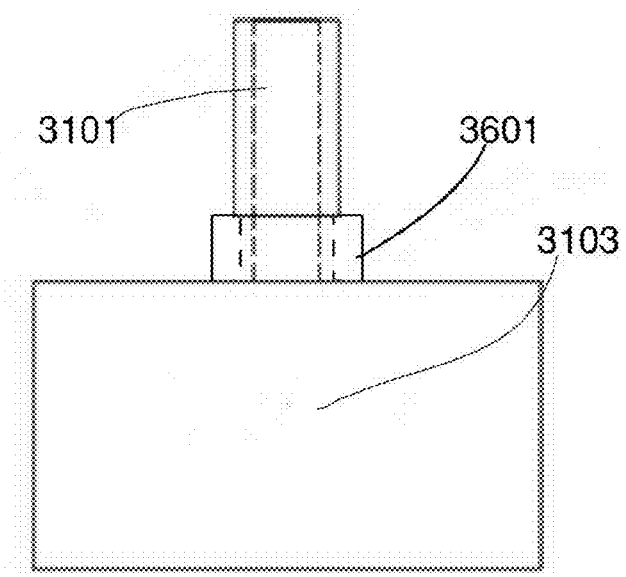
FIG. 36 illustrates a side view of the motor with the coupling nut indicating screw location when reaching the maximum drive distance, in the 3D printing apparatus, according to an embodiment herein.

FIG. 36 illustrates a side view of the motor and the nut with the stopper, according to an embodiment herein With respect to FIG. 36, a stopper 3601 is used under the coupling nut 3101 for the coupling nut 3101 to reach the starting position. The stopper 3601 is a nut 3101 secured to the top surface of the motor 3103. For example, the stopper 3601 is the same coupling nut 3101 but with a length of 5 mm secured to the top of the motor so the user just inserts the coupling nut and turns the nut 3101 until the motor 3103 turn on. The coupling nut 3101 is turned manually to reach the first position. When the apparatus is turned on, the stopper 3601 automatically raises both the motors by 3 mm thereby reaching the starting position. The fake motor is always set to the same height of the starting position (Refer FIG. 36).

Figure 37:
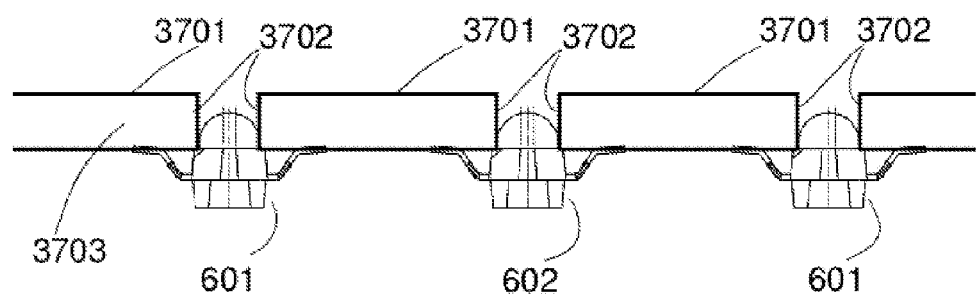
FIG. 37 illustrates a side cross sectional view of the PCB with a plated wall and a copper plane in the sensor device in the 3D printing apparatus, according to an embodiment herein.

FIG. 37 illustrates a side view of the sensor device designed on the PCB with a plated wall and a copper plane, according to an embodiment herein. According to an embodiment of herein, the components of the sensor board 204 are implemented on a Printed Circuit Board. In the PCB design, the layout of the components is optimally designed to acquire minimum area on the board. The IrLED 602 radiates unwanted noise through the PCB 3703 as the PCB 3703 is transparent to IR (Referring to FIG. 37). The holes 3702 for the IrLED 602 need to be plated and painted in dark. The plating eliminates the light from going through the PCB body or bouncing back. The phototransistors holes 3702 are configured to have the wall plated and painted in dark. The PCB 3703 further comprises a ground copper plane 3701 configured to block the bouncing light from the bed 110 by entering the PCB area 3703. According to an embodiment herein, a plurality of caps is placed between the IrLED 602 and the phototransistors 601. Although, the line of sight between the IrLED and the phototransistor assures the use of minimum radiation (about 0 degrees), the caps provide further safety to block the light of sight.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A three-dimensional (3-D) printer comprising a print head and a print bed, a positioning system configured to displace the print head and print bed relative to each other, the tilt between the axis of the print head and print bed being adjustable;
a calibrated sensor device having a light source, at least three photo detectors and an output,
the light source emitting a beam, the beam directed towards a reflecting surface, the beam reflecting from the surface, the detectors configured to detect the reflecting beam, the detectors of the sensor device generating an output signal, the output of the sensor device connected to a processor,
the processor loaded with software having an algorithm;
the algorithm used to calculate a tilt correcting output;
the output sent to a print bed tilt adjustment means to adjust the tilt between the print head and the print bed;
so that at any stage that is, before, during, and after the printing process upon activation the light source emits a beam that is reflected from the reflecting surface and detected by the detectors, the detectors of the sensor device then generating an output signal that is used by the processor to calculate a tilt correcting output which is sent to the print bed tilt adjusting means, which then adjusts the tilt between the print head and print bed,
wherein the algorithm includes the following steps:
grouping the output signal of the detectors, into a max group containing the detectors having a high reading output and
into min group containing the light detectors having a low reading output and then using a look-up table to calculate the tilt correcting output.

2. The 3-D printer as in claim 1 wherein the sensor device comprises a sensor board containing the emitter and detectors, the emitter and detector directed in the same direction.

3. The 3-D printer as in claim 1 alternatively claim 2, wherein the sensor device is attached to the print head and directed to the print bed.

4. The 3-D printer as in claim 1 alternatively claim 3 wherein the reflective surface is the surface of the print bed.

5. The 3-D printer as in claim 1 wherein the sensor device is calibrated by;
placing a test reflective surface perpendicular to the sensor device;
activating the light source with a pulsed signal so that the light source emits a pulsed beam towards the test reflective surface and is reflected so that it is detected by a detector to be calibrated;
increasing the time duration of the pulse signal so that the light source correspondingly emits a pulsed beam of increasing time duration;
until the detector output reaches a selected value, within the working range of the detector; thereby associating a certain light source pulse width with the detector;
repeating the same procedure with the other detectors in the sensor device until the same selected value has been reached and so a certain pulse width is associated with each of the detectors;
using the pulse width associated with each detector to determine a correction multiplier for each detector to be used by the processor and so normalize the output of each detector relative to each other.

6. The 3-D printer as in claim 1 wherein the light source is an infra-red light emitting diode and the detector is an infra-red detector.

7. The 3-D printer as in claim 1 wherein a reflective surface is mounted on the print bed to reflect the beam of the light source towards the detectors.

8. The 3-D printer as in claim 1 wherein the print bed tilt adjustment means has two actuators and a mount;

the actuators having two ends; the one end connected to the mount the other end connected to the print bed;

so that when a actuator is activated the tilt of the print bed is adjusted.

9. The 3-D printer as in claim 8 wherein the actuator comprises a stepper motor, the base of the motor being the first end, the stepper motor having a threaded shaft and a cylindrical member with an inner threaded bore, the motor shaft entering the cylindrical member from one side and the thread on the shaft engaging the thread of the cylindrical member, the other side of the cylindrical member being the second end; so that when the motor shaft rotates the cylindrical member is displaced along the shaft of the motor, and the first and second ends are displaced relative to each other.

10. A print bed tilt adjustment system for a 3-D printer comprising a calibrated sensor device having a light source, at least three photo detectors and an output, the light source emitting a beam, the beam directed towards a reflecting surface, the beam reflecting from the reflecting surface and the detectors configured to detect the reflecting beam, the sensor device generating an output signal, which is connected to a processor, the processor loaded with software having an algorithm; to calculate a tilt correcting output;

the output connected to a print bed tilt adjustment means; to adjust the tilt between the print head and the print bed;

so that at any stage that is, before, during, and after the printing process upon activation the light source emits a beam that is reflected from the reflecting surface and detected by the detectors of the sensor device, the detectors then generating an output signal that is used by the processor to calculate a tilt correcting output which is sent to the print bed tilt adjusting means, which then adjusts the tilt between the print head and print bed;

wherein the algorithm includes the following steps:

grouping the output signal of the detectors, into a max group containing the detectors having a high reading output and into a min group containing the light detectors having a low reading output and then using a look-up table to calculate the tilt correcting output.

* * * * *